(12) United States Patent
Oki

(10) Patent No.: US 12,296,674 B2
(45) Date of Patent: May 13, 2025

(54) VEHICLE DISPLAY DEVICE AND VEHICLE DISPLAY METHOD

(71) Applicant: Nissan Motor Co., Ltd., Yokohama (JP)

(72) Inventor: Kyohei Oki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 513 days.

(21) Appl. No.: 17/628,267

(22) PCT Filed: Jun. 2, 2021

(86) PCT No.: PCT/JP2021/021082
§ 371 (c)(1),
(2) Date: Jan. 19, 2022

(87) PCT Pub. No.: WO2022/254634
PCT Pub. Date: Dec. 8, 2022

(65) Prior Publication Data
US 2023/0356588 A1    Nov. 9, 2023

(51) Int. Cl.
*B60K 35/00* (2024.01)
*B60K 35/10* (2024.01)
(Continued)

(52) U.S. Cl.
CPC ............. *B60K 35/00* (2013.01); *B60K 35/10* (2024.01); *B60K 35/22* (2024.01); *B60K 35/28* (2024.01);
(Continued)

(58) Field of Classification Search
CPC ........ B60K 35/00; B60K 35/81; B60K 35/28; B60K 2360/171; B60K 2360/11;
(Continued)

(56) References Cited

U.S. PATENT DOCUMENTS

2012/0262482 A1* 10/2012 Miwa .................. G09B 29/106
345/629
2014/0075374 A1* 3/2014 Jitkoff .................. G06F 3/0482
715/784
(Continued)

FOREIGN PATENT DOCUMENTS

JP       2010-2317 A      1/2010
WO   2014/039157 A1   3/2014

OTHER PUBLICATIONS

Extended European Search Report of Jul. 12, 2024 of corresponding European Patent Application No. 21848124.0.

*Primary Examiner* — Stephen S Hong
*Assistant Examiner* — Darrin Hope
(74) *Attorney, Agent, or Firm* — Global IP Counselor, LLP

(57) ABSTRACT

A vehicle display device is configured to superpose a background layer on a first layer for displaying map and/or periphery information, and superpose a layer for displaying information other than the map information and the vehicle periphery information on the background layer. In accordance with a user operation, the display is switched from a transparent background layer where the user can see the information displayed on the first layer to an opaque background layer where the user cannot see the information displayed on the first layer. While switching between the transparent background layer to the opaque background layer, a visual effect is not added to show the switching. After the switch, a transmittance of the background layer is changed and a visual effect is not added to show the switching of the background layer.

14 Claims, 35 Drawing Sheets

(51) Int. Cl.
  *B60K 35/22* (2024.01)
  *B60K 35/28* (2024.01)
  *B60K 35/29* (2024.01)
  *B60K 35/81* (2024.01)

(52) U.S. Cl.
  CPC .............. *B60K 35/29* (2024.01); *B60K 35/81* (2024.01); *B60K 2360/11* (2024.01); *B60K 2360/171* (2024.01); *B60K 2360/18* (2024.01)

(58) Field of Classification Search
  CPC .... B60K 35/29; B60K 2360/18; B60K 35/10; B60K 35/22
  See application file for complete search history.

(56) References Cited

U.S. PATENT DOCUMENTS

| | | | |
|---|---|---|---|
| 2014/0210604 A1* | 7/2014 | Kawashima | B60K 35/00 340/439 |
| 2018/0040302 A1* | 2/2018 | Kuzuoka | G01C 21/3697 |
| 2019/0244324 A1* | 8/2019 | Watanabe | G06T 3/4038 |
| 2020/0292904 A1* | 9/2020 | Larry | G02F 1/1313 |
| 2020/0369150 A1* | 11/2020 | Nakajima | G01C 21/367 |
| 2020/0376960 A1* | 12/2020 | Hélot | G02B 30/52 |
| 2021/0178900 A1* | 6/2021 | Sudoh | G02B 27/0101 |

\* cited by examiner

VEHICLE DISPLAY DEVICE AND VEHICLE DISPLAY METHOD

CROSS-REFERENCE TO RELATED APPLICATIONS

This application is a U.S. national stage application of International Application No. PCT/JP2021/021082, filed on Jun. 2, 2021.

BACKGROUND

Technical Field

The present invention relates to a vehicle display device and a vehicle display method.

Background Information

A system is known in which, when a command to scroll workspaces (windows for opening applications) is detected with respect to a plurality of workspaces stacked along a stacking axis, the plurality of stacked workspaces are traversed (moved) along the stacking axis (see, Patent Document 1: International Publication No. 2014/039157—Patent Document 1). In this system, when the workspaces are traversed, it is possible to reduce the size of the workspaces or to fade in into another workspace while the workspaces are being reduced in size.

SUMMARY

However, in the prior art described above, in the case of displaying information in which the displayed content change depending on the travel location of a vehicle, such as map information, there is the problem that if a visual effect such as a fade-in is added to the information display portion, the processing load required for the display becomes large.

An object of the present invention is to provide a vehicle display device and a vehicle display method that can suppress increases in the processing load required for display.

In the present invention, in a case in which a display is carried out by superposing a second layer for displaying a dummy background on a first layer for displaying map information and/or vehicle periphery information, and a third layer for displaying information other than the map information and the vehicle periphery information is superposed on the second layer, when switching, in accordance with a user operation, between a first state, in which the dummy background of the second layer is transparent and the user can see the information displayed on the first layer, and a second state, in which the dummy background of the second layer is opaque and the user cannot see the information displayed on the first layer, at least one effecting process, from among the switch between the first state and the second state, ending the state before the switch, and starting the state after the switch, is not executed with respect to a display portion for the information to be displayed on the first layer, while switching between the first state and the second state. The transmittance of the dummy background is then changed to that of the state after the switch, and an effecting process that adds the visual effect showing at least one the switch between the first state and the second state, the ending of the state before the switch, and the starting of the state after the switch, is executed with respect to at least one of the display portion for the information to be displayed on the third layer in the first state and the display portion for the information to be displayed on the third layer in the second state, while switching between the first state and the second state, thereby solving the problem described above.

By means of the present invention, it is possible to suppress an increase in the processing load required for display.

BRIEF DESCRIPTION OF THE DRAWINGS

Referring now to the attached drawings which form a part of this original disclosure.

DETAILED DESCRIPTION OF EMBODIMENTS

An embodiment of a vehicle display device and a vehicle display method according to the present invention will be described below with reference to the drawings. In the vehicle described below, it is assumed that the driver's seat is installed on the left side of the vehicle; for vehicles in which the driver's seat is installed on the right side of the vehicle, the following description should be read with the left and right symmetrically interchanged.

Configuration of the Vehicle Display Device

Figure 1:
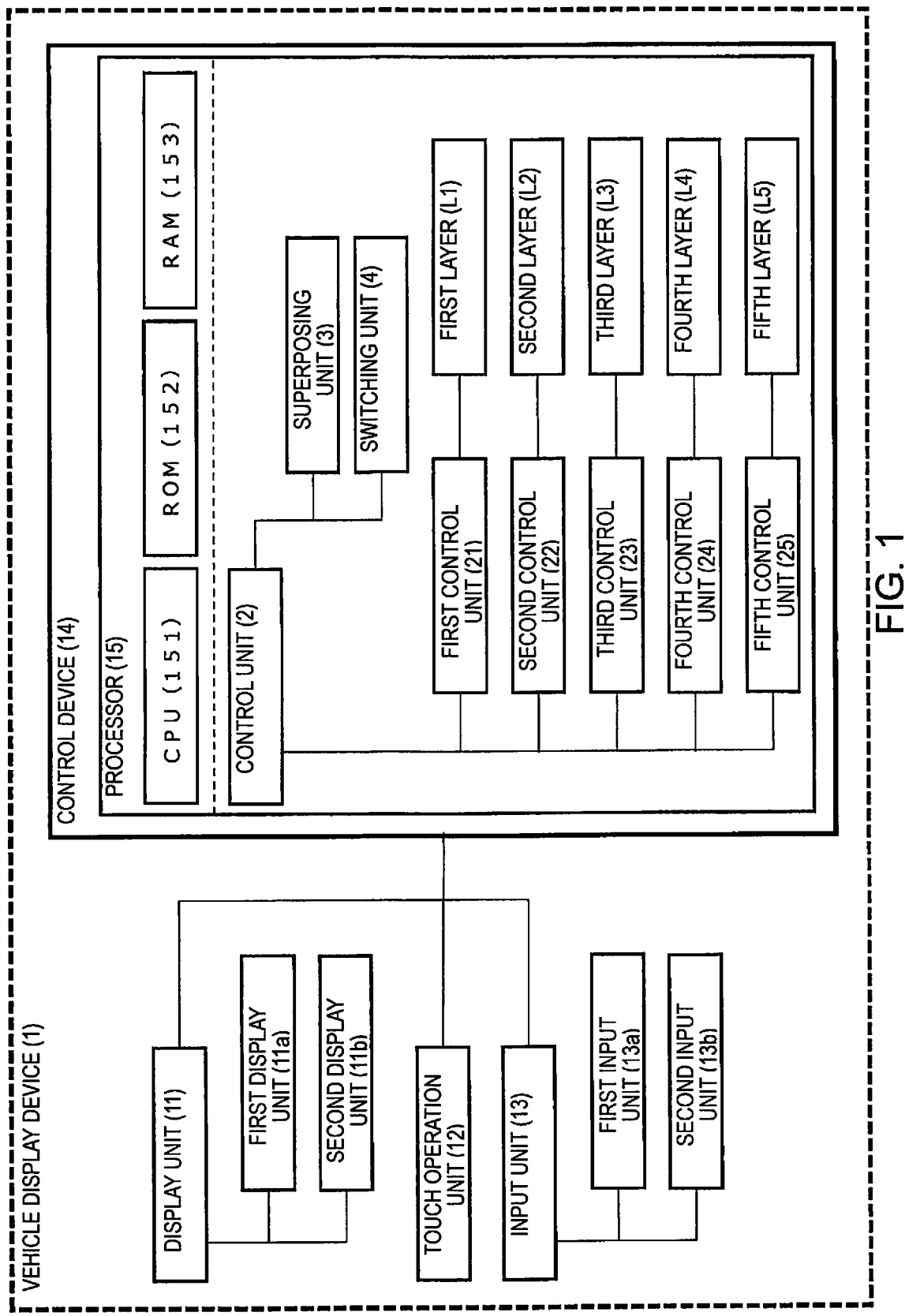
FIG. 1 is a block diagram showing one embodiment of a vehicle display device according to the present invention.

FIG. 1 is a block diagram showing a vehicle display device 1 according to the present invention. In a conventional vehicle display device, there are cases in which effects such as fade-in and fade-out are added to an information display portion in order to change the display of the information whose contents to be displayed change from moment to moment in accordance with the travel location of the vehicle, such as the map information of a navigation device. In such cases, because the information to be displayed changes from moment to moment, the arithmetic processing load required for displaying information such as map information increases, and there is the risk that the information will not be smoothly displayed, such as the information display portion freezing up during rendering. In addition, when multiple programs are run in parallel to control the display, there are cases in which the processing of some of the programs is delayed, and thus information that should not be displayed is displayed at an unintended time, thereby causing the screen of the vehicle control device to flicker. The vehicle display device 1 according to the present invention changes the display of information by executing an effecting process that increases user satisfaction while suppressing the occurrence of screen flicker.

As shown in FIG. 1, the vehicle display device 1 comprises a display unit 11, a touch operation unit 12, an input unit 13, and a control device 14. Devices constituting the vehicle display device 1 are connected to each other in a state of being able to mutually send and receive data by means of a known means such as wired or wireless LAN, represented by a CAN (Controller Area Network), for example. The control device 14 need not be provided together with the display unit 11, the touch operation unit 12, and the input unit 13, and may be provided in a remote server away from the vehicle.

The display unit 11 provides information to a user, and is, for example, a liquid-crystal display, a head-up display (HUD), or a projector. In addition to the driver, users include occupants in the passenger seat or rear seat, as well as occupants that are present in a location away from the vehicle but are riding in the vehicle virtually using an avatar (alter ego). In the present embodiment, the display unit 11 is installed in front of the driver's seat of the vehicle, and the length thereof in the vehicle width direction is, for example, 30-50% of the total width of a general vehicle. If the total width of a general vehicle is about 1.5 m, the length of the display 11 is 45-75 cm, which, converted to the size of the display, would be about 20 to 35 inches (inch). As a result, it is possible to strike a good balance between operability for the user and the size of the display unit 11. In addition, the display unit 11 may be a single display unit as a hardware device but also may have, as hardware devices, a first display unit 11a, and a second display unit 11b that differs from the first display unit 11a and that is installed further on the passenger seat side than the first display unit 11a in the vehicle width direction, as indicated in FIG. 1. In addition, the display unit 11 may be composed of three or more display units as hardware devices, and may have a speaker in addition to a screen for displaying information.

Figure 2A:
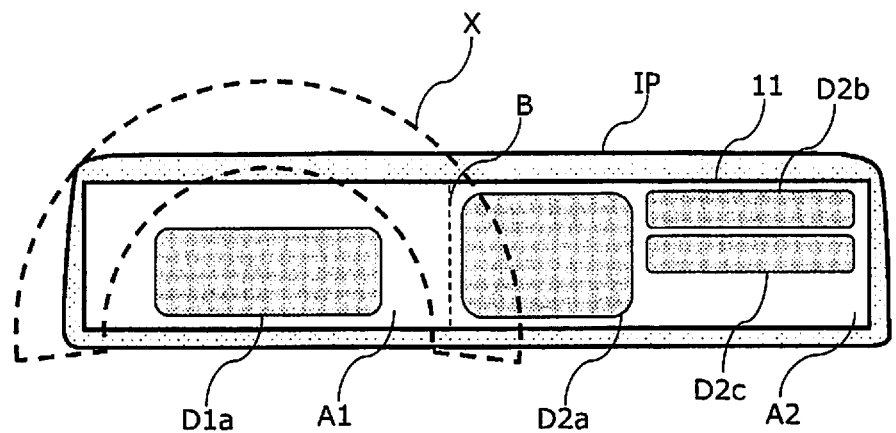
FIG. 2A is a front view showing one example of a display unit of FIG. 1.

FIG. 2A is a front view showing one example of the display unit 11. In FIG. 2A, the display unit 11 is installed in an instrument panel IP of the vehicle, and has a first area A1 that displays information used for controlling vehicle travel, and a second area A2 that displays information that is not used for controlling vehicle travel. The first area A1 and the second area A2 are divided by a boundary B indicated by the broken line near the center of the display unit 11, and the size of the first area A1 and of the second area A2 can be changed by means of a user operation or an instruction from the control device 14. Information used for controlling vehicle travel is primarily used by the driver, thus the first area A1 is provided on the driver's seat side of the display unit 11. That is, the first area A1 is provided in a position closer to the driver than the second area A2.

In the first area A1 of FIG. 2A, the information used for controlling vehicle travel is displayed in the hatched portion indicated by D1a. Information used for controlling vehicle travel is, for example, information used for such controls as speed control, steering control, and stability control of the vehicle, and includes information acquired from various sensors of the vehicle such as information indicating the travel state of the vehicle. Stability control of the vehicle is, for example, controlling the roll angle and the yaw angle of the vehicle to thereby suppress skidding of the vehicle. Examples of information displayed in the first area A1 include the travel speed and acceleration of the vehicle, the engine rotation speed, the temperature of the cooling water and engine oil, the operating state of the parking brake, the position of the transmission gears, the operating state of the turn signal, the lighting state of the headlights, the operating state of the wipers, the angular velocity of the vehicle, etc. In addition, besides information acquired from the sensors, information indicating the travel state of the vehicle includes information indicating the status of the vehicle's autonomous travel assistance. Examples include information indicating whether only one of either autonomous speed control or autonomous steering control is being carried out, information indicating whether speed control and steering control are autonomously controlled, information indicating whether lane-change assist is being executed, and information indicating whether a preceding vehicle is being followed by means of autonomous travel assistance.

On the other hand, in the second area A2 of FIG. 2A, the information that is not used for controlling vehicle travel is displayed in the hatched portions indicated by D2a, D2b, and D2c. Information that is not used for controlling vehicle travel is information that is not used for such controls as speed control, steering control, and stability control of a vehicle, and information that does not indicate the travel state of the vehicle. For example, map information of a navigation device, operation information of on-board AV devices such as a radio, music player, DVD player, application information such as games, information pertaining to background images of the display unit 11, and the like. In the second area A2 of FIG. 2A, information is displayed divided into three parts, D2a, D2b, and D2c, but the form of information display in the second area A2 is not particularly limited, and information may be displayed so as to be divided into a plurality of parts for each piece of information, or be displayed collectively as one part. Additionally, there may be portions of the second area A2 in which no information is displayed.

An area X shown in FIG. 2A combines the area of the steering wheel as seen by the driver and the area on which the driver's hands that operate the steering wheel rest as seen by the driver. Hereinbelow, the area X is also referred to as the steering wheel operation area. The display unit 11 of the present embodiment does not display information in the parts of the first area A1 that are included in the steering wheel operation area X, that is, the parts that the steering wheel or the driver's hands overlap from the driver's point of view. This is because information displayed behind the steering wheel or hands cannot be seen by the driver; therefore, if information that is not used for controlling vehicle travel is displayed in a part that the steering wheel operation area X overlaps, the driver cannot ascertain the travel state of the vehicle, and thus cannot concentrate on driving. In the case of FIG. 2A, information used for controlling vehicle travel is displayed in the D1a portion of the first area A1, and the outer edge of D1a is not included in the area X as seen by the driver. In contrast, information displayed in the second area A2 may be included in the steering wheel operation area X as seen by the driver, such as the display portion D2a of FIG. 2A. This is because there is no hindrance to the driving operation even if information that is not used for controlling vehicle travel cannot be seen by the driver.

The vehicle display device 1 according to the present invention changes the display of information that changes from moment to moment, such as map information from a navigation device, while suppressing the occurrence of screen flicker, but information that changes from moment to moment, from among the information displayed by the vehicle display device 1, is not limited to map information from a navigation device. For example, information such as the travel speed, acceleration, and engine rotation speed of the vehicle is also information that changes from moment to moment in accordance with the travel state. Thus, the changing of the display related to the vehicle display device 1 can be applied to both the display portion for the information displayed in the first area A1 and the display portion for the information displayed in the second area A2.

Figure 2B:
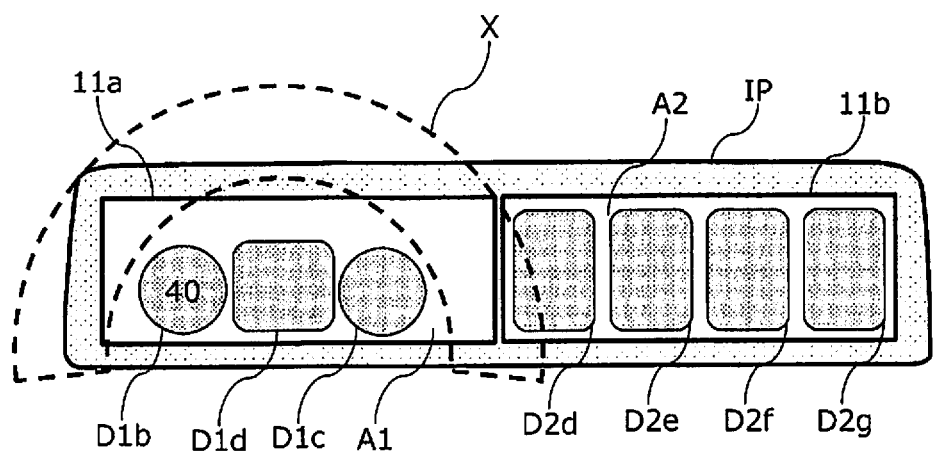
FIG. 2B is a front view showing one example of a first display unit and a second display unit of FIG. 1.

Next, FIG. 2B is a front view showing another example of the display unit 11. The display unit of FIG. 2B consists of the first display unit 11a and the second display unit 11b, both of which are installed in the instrument panel IP of the vehicle. The first display unit 11a and the second display unit 11b are different display units, and the second display unit 11b is installed further on the passenger seat side than the first display unit 11a in the vehicle width direction. In FIG. 2B, the first display unit 11a is set in the first area A1 and the second display unit 11b is set in the second area A2. Thus, the first display unit 11a displays information used for controlling vehicle travel, and the second display unit 11b displays information that is not used for controlling vehicle travel. In addition, the information to be displayed can be controlled, where the first display unit 11a and the second display unit 11b are considered as one display area, and the first area A1 or the second area A2 may be set to extend across the first display unit 11a and the second display unit 11b.

In the first area A1 of FIG. 2B, unlike the first area A1 of FIG. 2A, information used for controlling vehicle travel is displayed, divided into three parts, D1b, D1c, and D1d with the hatching. The display portion D1b displays the vehicle speed, for example, and because the vehicle is traveling at 40 km/h, "40" is displayed in FIG. 2B. The display portion D1c displays, for example, the engine rotation speed in units of rpm. The display portion D1d displays, for example, icons indicating the operating state of the parking brake, the position of the gears, the operating state of the turn signal, the lighting state of the headlights, the operating state of the wipers, the state of autonomous travel assistance, and the like.

In the first area A1 of FIG. 2B, parts included in the steering wheel operation area X do not include the outer edges of the display portions D1b, D1c, and D1d, in the same manner as in FIG. 2A. In addition, in the first area A1 of FIG. 2B, information is displayed divided in three parts, D1b, D1c, and D1d, but the form of information display in the first area A1 is not particularly limited, and information may be displayed so as to be divided into a plurality of parts for each piece of information, or be displayed collectively as one part, as in the first area A1 of FIG. 2A. Additionally, there may be portions of the second area A2 in which no information is displayed.

On the other hand, in the second area A2 of FIG. 2B, unlike the second area A2 of FIG. 2A, information that is not used for controlling vehicle travel is displayed, divided into four parts, D2d, D2e, D2f, and D2g with the hatching. In addition, in the same manner in regard to the display portion D2a of FIG. 2A, although the outer edge of the display portion D2d of FIG. 2B is located in a position that includes the steering wheel operation area X as seen by the driver, there is no hindrance to the driving operation, even if this portion is not visible to the driver. It is not necessary for the first area A1 to correspond to the first display unit 11a and for the second area A2 to correspond to the second display unit 11b; a part of the first display unit 11a may be set as the first area A1, and the second display unit 11b and the part of the first display unit 11a not included in the first area A1 may be set as the second area A2.

Returning to FIG. 1, the touch operation unit 12 is a device that receives an instruction input by means of a stylus pen or the user's finger in order to operate the vehicle display device 1 in accordance with the received instruction, and may be provided together with the display unit 11 as a touch panel. Inputs to the touch operation unit 12 are detected from the movement of the user's finger or stylus pen that is in contact with the touch operation unit 12, for example. For example, if the user touches the outer edge of the information display portion with one finger and swipes the outer edge while keeping the finger in contact with the touch operation unit 12, an input to expand the display portion in the direction in which the outer edge was swiped is detected. In addition, if the user touches the display portion with a two-finger swipe gesture, an input to translate the display portion in the direction of the swipe gesture is detected. In addition, if the user touches the display portion with a three-finger swipe gesture, an input to translate the display portion in the direction of the swipe gesture and move the display portion off the screen is detected. The movement of the user's finger and stylus pen is not limited thereto, and inputs corresponding to various other movements are set in advance.

The touch operation unit 12 receives an input to change the display of the second area A2 but does not receive an input to change the display of the first area A1. This is because if the driver is able to touch a portion that overlaps the steering wheel operation area X and operate the display unit 11, the driver may not be able to concentrate on the operation of the steering wheel. This is also because if a user other than the driver is able to issue an instruction to change the display of the first area A1, there is the risk that display of information used for controlling travel will be changed contrary to the driver's intentions, and the driver will not be able to concentrate on driving.

Figure 3:
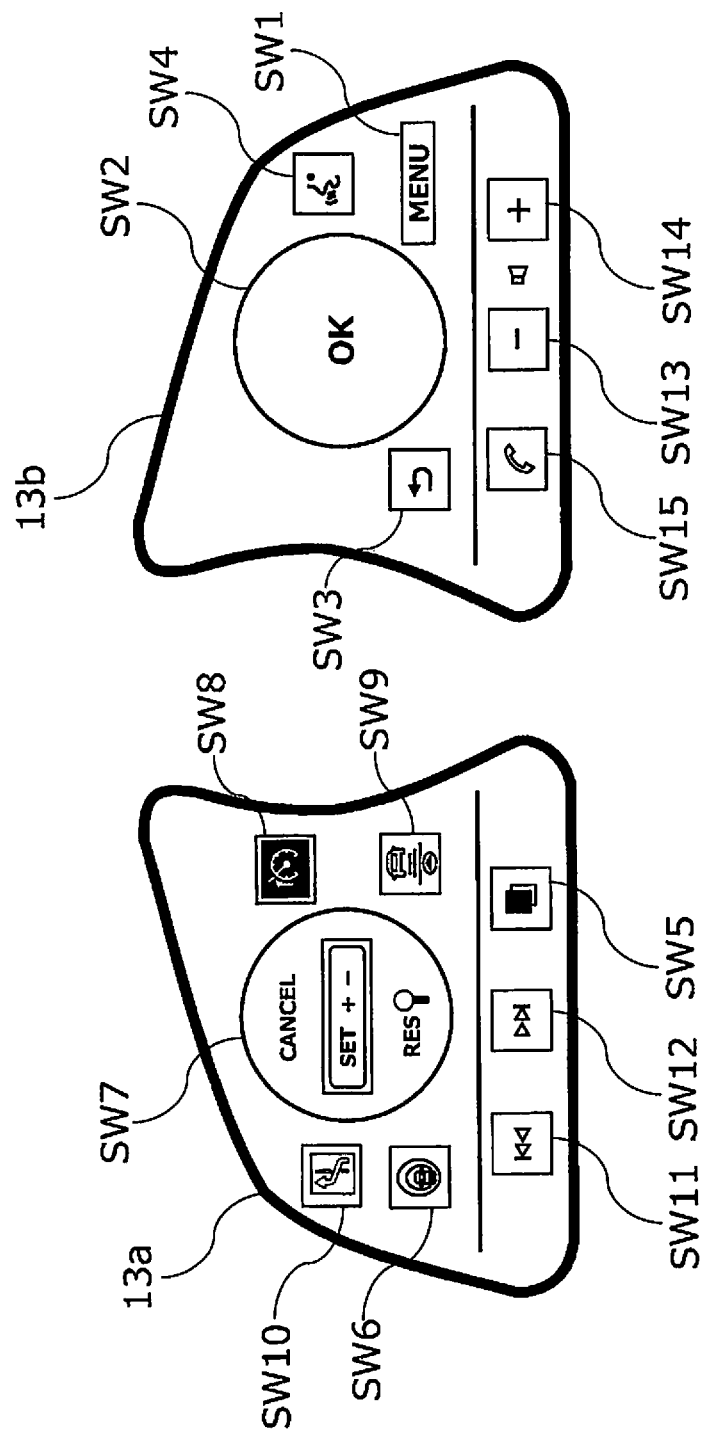
FIG. 3 is a front view showing one example of an input unit of FIG. 1.

The input unit 13 is a device for inputting an operation to the display unit 11, and is provided, without limitation to the number thereof, in a position on the steering wheel from which it can be operated by the driver with the fingers while the steering wheel is held. FIG. 3 is a front view showing one example of an input unit provided on the steering wheel, and, in a state in which the steering wheel is not turned (i.e., a state in which the steering angle is 0°), a first input unit 13a shown on the left side of FIG. 3 is provided on the left side of the steering wheel, and a second input unit 13b shown on the right side in FIG. 3 is provided on the right side of the steering wheel. The first input unit 13a and the second input unit 13b are provided in appropriate positions within a range that does not hinder the driver's operation of the steering wheel. The first input unit 13a and the second input unit 13b are provided with switches SW1-SW15 for inputting instructions to change the display of the display unit 11. The driver can press the switch SW1 of the second input unit 13b to thereby display a menu screen on the display unit 11. The inputting of operations (up/down/left/right) and confirmations on the menu screen are carried out using switch SW2, and switch SW3 is pressed when returning to the previous screen. Switch SW4 is a switch for activating a function for voice input using voice recognition. In this manner, input from the first input unit 13a and the second input unit 13b can also be carried out by voice.

The presentation of information used for travel control such as speed control, steering control, and stability control of the vehicle can be switched by pressing switch SW5 of the first input unit 13a. In addition, pressing switch SW6 of the first input unit 13a activates the autonomous travel assistance function, which adjusts the vehicle speed and inter-vehicular distance set by means of switch SW7. Specifically, the set vehicle speed to be used during constant speed travel control can be changed by pressing switch SW8, and the inter-vehicular distance to be used during following travel can be changed by pressing switch SW9. In addition, the lane-change assist function can be activated by pressing switch SW10. Additionally, switches SW11 and SW12 of the first input unit 13a are switches for changing the track that is being played back when the music player is activated, and switches SW13 and SW14 of the second input unit 13b are used to change the playback volume. Switch SW15 of the second input unit 13b is used to activate the phone function, which receives inputs only when prescribed conditions based on the laws and regulations of each country are met.

In the present embodiment, only the driver can input an operation to the input unit 13; thus, operations input from the input unit 13 are deemed to have been approved by the driver. For example, an operation to display an image of the vehicle periphery acquired by an imaging device, not shown, on the entire display unit 11 would limit the display of information used for controlling vehicle travel; thus, the configuration may be such that such inputs are only received when they are from the input unit 13.

Returning to FIG. 1, the control device 14 is a device in the vehicle that provides necessary information to the user and that switches the information provided to the user in accordance with a user operation. The user operation is input from the touch operation unit 12 and the input unit 13. The control device 14 uses a processor 15 to realize a function for providing necessary information to the user and a function for switching the displayed information in accordance with the operation input by the user. The processor 15 has a ROM (Read-Only Memory) 152 that stores a program, a CPU (Central Processing Unit) 151 which is an operating circuit that executes the program stored in the ROM 152 to thereby function as the control device 14, and a RAM (Random-Access Memory) 153 that functions as an accessible storage device.

The program used in the control device 14 of the present embodiment includes a control unit 2, which is a function block in the control device 14 for realizing a function for providing information to the user and a function for switching the information provided to the user. The control unit 2 has a function for controlling the display of the information displayed on the display unit 11 and a function for switching the information displayed on the display unit 11 in accordance with the operation input from the touch operation unit 12 and/or the input unit 13. The control unit 2 can directly control the display of all types of information displayed on the display unit 11. However, there are various types of information for which the display is controlled by the vehicle display device 1, so that if all of the information is controlled only by the control unit 2, the arithmetic processing of the control unit 2 may become overloaded. Thus, normally, the control unit 2 comprises a plurality of display units as slave units, and indirectly controls the display of information on the display unit 11 via said plurality of display units.

The control unit 2 of the present embodiment includes a first control unit 21, a second control unit 22, a third control unit 23, a fourth control unit 24, and a fifth control unit 25, and functions as a master device to control each of the first through fifth control units 21-25. The first control unit 21 controls the display of information in a first layer L1, the second control unit 22 controls the display of information in a second layer L2, the third control unit 23 controls the display of information in a third layer L3, the fourth control unit 24 controls the display of information in a fourth layer L4, and the fifth control unit 25 controls the display of information in a fifth layer L5. A layer is a virtual screen for displaying information, such as an image, and the type of information displayed on each layer is set in advance in accordance with its importance to vehicle travel control, or the like. In addition, the control unit 2 of the present embodiment has a superposing unit 3 that superposes the various types of information displayed on the first to fifth layers L1-L5 in order to generate display information, which is information displayed on the display unit 11, and a switching unit 4 that switches the information displayed on the display unit 11 in accordance with an operation input by the user. FIG. 1 shows each unit extracted for the sake of convenience.

Function of Control Units

Figure 4:
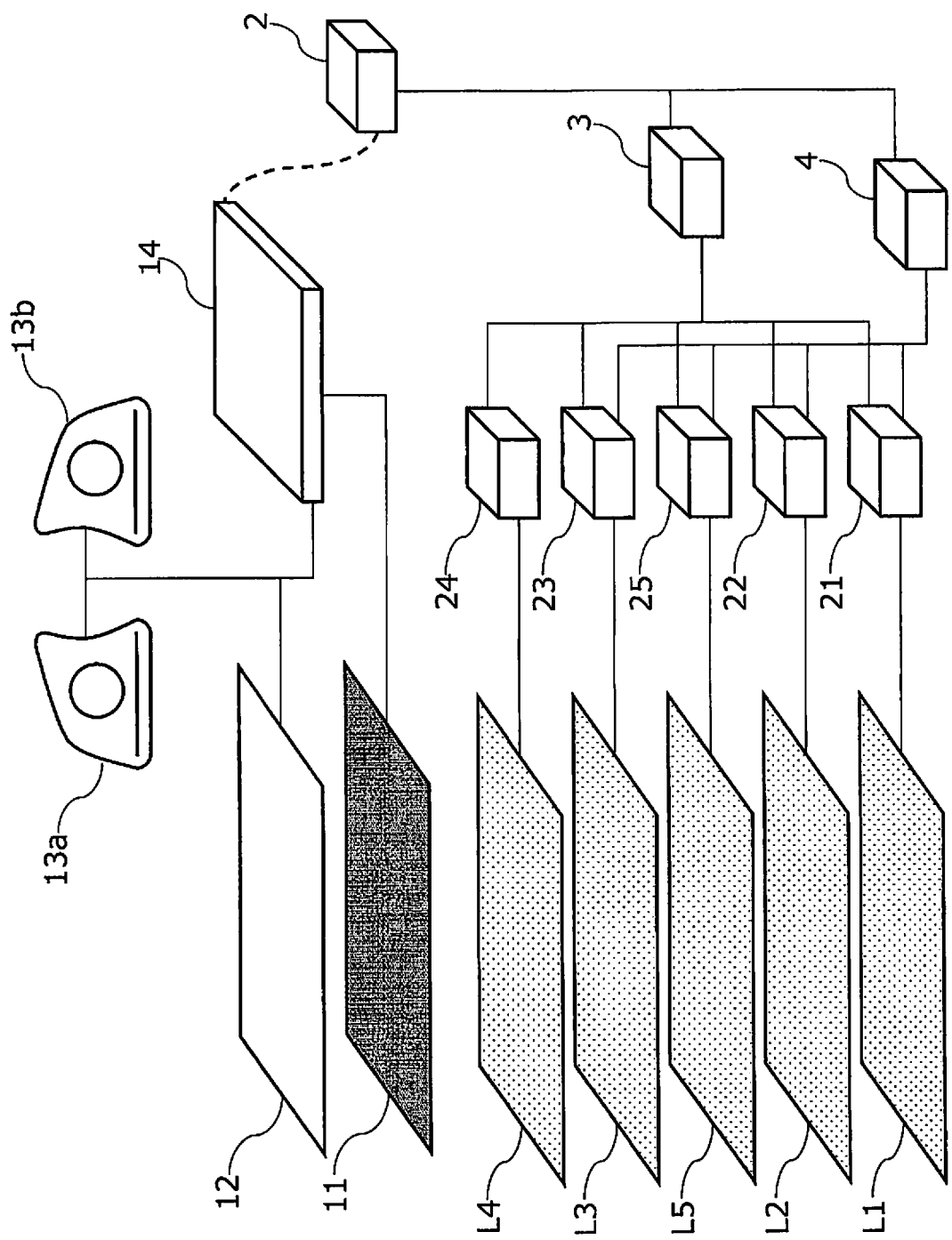
FIG. 4 is a block diagram showing the display unit, touch operation unit, input unit, and control device of FIG. 1, as well as the relationship between a superposing unit, a switching unit, first to fifth control units, and first to fifth layers.

The functions performed by each function block shown in FIG. 1 will now be described with reference to FIG. 4. FIG. 4 is a block diagram showing the display unit 11, touch operation unit 12, the input unit 13 including the first input unit 13a and the second input unit 13b, and the control device 14 of the vehicle display device 1, as well as the relationship between the control unit 2, the superposing unit 3, the switching unit 4, the first control unit 21 to the fifth control unit 25, and the first layer L1 through the fifth layer L5. In FIG. 4, the display unit 11 is connected to the control device 14 and controlled by the control unit 2 included in the control device 14. The control unit 2 acquires display information generated by the superposing unit 3 and outputs same to the display unit 11. As a result, the display information is displayed on the display unit 11, and through this display necessary information is provided to the user. In FIG. 4, in order to indicate that the control unit 2 is a function block included in the control device 14, the control unit 2 and the control device 14 are connected by a broken line.

The touch operation unit 12, the first input unit 13a, and the second input unit 13b are connected to the control device 14, and from at least one of these units an operation to change the display of the display unit 11 is input to the control device 1. For example, if both the display unit 11 and the touch operation unit 12 are provided together as a touch panel, when the user touches, by means of a stylus pen, a button for closing the window of an application displayed on the display unit 11, an operation to close the application window displayed on the display unit 11 is input to the control device 14. In addition, when the user presses the switch SW1 of the second input unit 13b provided on the steering wheel in order to display the menu screen on the display unit 11, an operation to cause the display unit 11 to display the menu screen is input to the control device 14. The user operation input to the control device 14 is acquired by the control unit 2, and the control unit 2 that acquires the operation causes the switching unit 4 to execute switching of the display corresponding to the acquired operation.

The control unit 2 has a function for controlling at least the display of information on the first layer L1, the display of a dummy background on the second layer L2, and the display of information on the third layer L3, and also has a function for controlling the display of the display information that is generated by the superposing unit 3 and that is to be displayed on the display unit 11. In addition to the display of information on the first layer L1, the display of information on the second layer L2, and the display of information on the third layer L3, the control unit 2 may have a function for controlling the display of information on the fourth layer L4 and the display of a background on the fifth layer L5. In FIG. 4, the superposing unit 3 is connected to the control unit 2, the first control unit 21 through the fifth control unit 25 are connected to the superposing unit 3, and the first layer L1 through the fifth layer L5 are respectively connected to the first control unit 21 through the fifth control unit 25. In this case, the control unit 2 controls the first control unit 21 through the fifth control unit 25 via the superposing unit 3 to thereby control the display of information on each layer. The form in which the control unit 2 controls the first control unit 21 through the fifth control unit 25 is not limited to the form shown in FIG. 4, and the control unit 2 may directly control the first control unit 21 through the fifth control unit 25 without the interposition of the superposing unit 3.

Each of the above-described first layer L1 through the fifth layer L5 is a virtual screen that displays information such as an image, and the information displayed on each layer can be superposed like cells. This superposing is executed using the function of the superposing unit 3, and the superposed information is output as display information to the display unit 11 via the control unit 2.

The superposing unit 3 has a function for superposing the information displayed on each of the first layer L1 through the fifth layer L5 and is able to generate display information by superposing at least the second layer L2 on the first layer L1, and the third layer L3 on the second layer L2. In addition, when the display information is generated, the superposing unit 3 can superpose the fourth layer L4 on the third layer L3, or insert the fifth layer L5 between the second layer L2 and the third layer L3, and thereby superpose the fifth layer L5 on the second layer L2 and the third layer L3 on the fifth layer L5.

As shown in FIG. 4, the first layer L1 through the fifth layer L5 of the present embodiment are arranged in the order of the first layer L1 as the bottom layer, the second layer L2, the fifth layer L5, the third layer L3, and the fourth layer L4 as the top layer. When the information of each layer is superposed by means of the function of the superposing unit 3, the information displayed on the fourth layer L4 is displayed in its entirety on the display unit 11. On the other hand, the information displayed on the third layer L3 is not displayed in the portion displaying information on the fourth layer L4, and is only displayed in the portion not displaying information on the fourth layer L4. That is, of the information displayed on the third layer L3, the information displayed in the portion where information is displayed on the fourth layer L4 is hidden by the information displayed on the fourth layer L4 and will not be displayed on the display unit 11. Similarly, with regard to the fifth layer L5, the third layer L3, and the first layer L1, the portions where information is displayed on an upper layer preferentially display the information displayed on the upper layer, and, of the information displayed on a lower layer, the portions hidden by the information displayed on an upper layer are not displayed on the display unit 11.

Figure 5A:
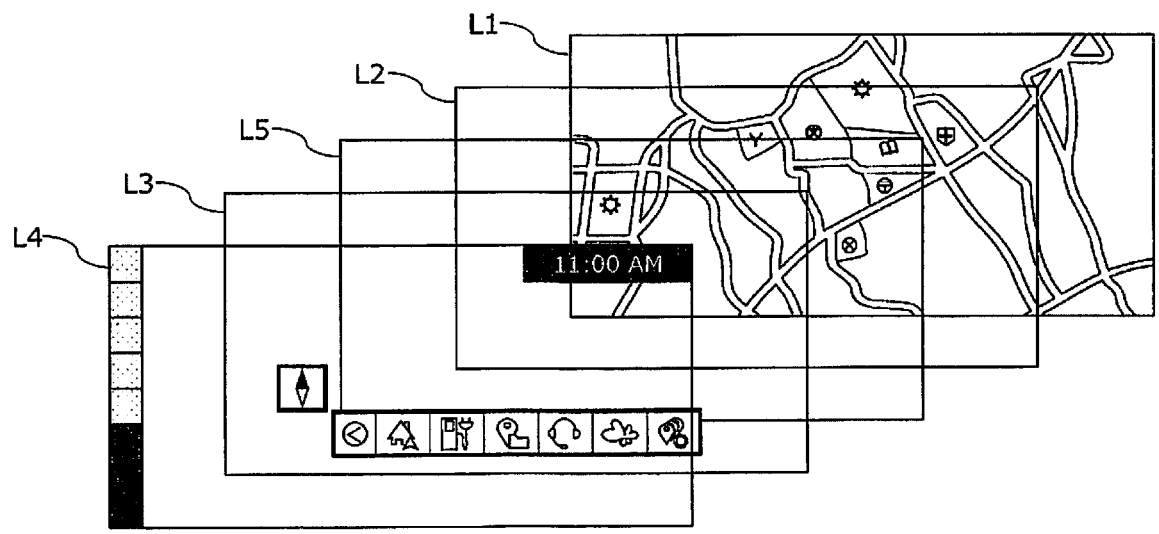
FIG. 5A is one example of information displayed on the first to the fifth layers of FIG. 1.
Figure 5B:
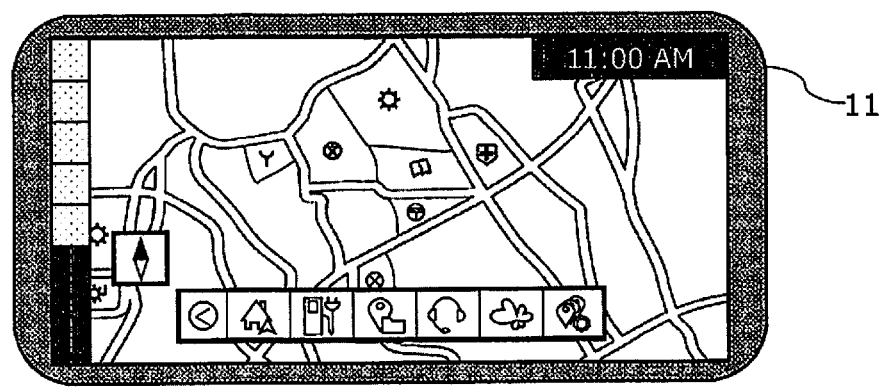
FIG. 5B is one example of information displayed on the display unit of FIG. 1.

The superposing of layers carried out by the superposing unit 3 will be described using FIGS. 5A and 5B as an example. In this example, as shown in FIG. 5A, the fourth layer L4 displays an image of buttons to be touched when inputting an operation to the touch operation unit 12 on the left side and a clock is displayed on the upper right side, and the third layer L3 displays an image that serve as icons for inputting an operation to the touch operation unit 12 when changing the display of the display unit 11, and an image indicating the bearing of the map information in the form of a compass. In addition, nothing is displayed on the fifth layer L5 and the second layer L2, and map information is displayed on the first layer L1. In this case, when the first layer L1 through the fifth layer L5 are superposed by means of the superposing unit 3, the display information shown in FIG. 5B is generated and displayed on the display unit 11. In the display information shown in FIG. 5B, the image displayed on the third layer L3 and the image and clock displayed on the fourth layer L4, which are upper layers, are displayed on the map information displayed on the first layer L1. That is, in the portions where the icon images of the third layer L3 and the image and the clock of the fourth layer L4 are displayed, the map information is hidden and not displayed on the display unit 11. The layers shown in FIG. 4 are the five layers of the first layer L1 through the fifth layer L5, but a layer for displaying information input from an external device not shown in FIG. 1 may also be provided.

Content Displayed on Layers

The first control unit 21 through the fifth control unit 25 and the first layer L1 through the fifth layer L5 shown in FIG. 4 will be described next. The first control unit 21 has a function for controlling the display of information displayed on the first layer L1. The information displayed on the first layer L1 is, for example, information whose content to be displayed changes in accordance with the travel location of the vehicle. An example of such information is map information of a navigation device. Map information includes road information, facility information, and attribute information thereof, and the road information and the road attribute information include information such as the width of the road, the radius of curvature of the road, road shoulder structures, traffic rules (speed limit, whether lanes change are permitted), road confluences and branch points, locations where the number of lanes increases or decreases, etc. In addition, the map information may be high-precision map information that includes two-dimensional location information and/or three-dimensional location information, road/lane boundary information at each map coordinate, road attribute information, inbound/outbound lane information, lane identification information, access point lane information, and the like.

The road/lane boundary information of the high-precision map information is information indicating the boundary between the travel path on which a host vehicle travels and everything else. The travel path on which the host vehicle travels is a road for the host vehicle to travel on, and the form of the travel path is not particularly limited. There are boundaries on both the left and right sides of the host vehicle travel direction, the form of which is not particularly limited. Boundaries include road markings, road structures, and the like, road markings include lane boundaries and center lines, and road structures include medians, guardrails, curbs, tunnels, side walls of expressways, and the like.

The navigation device has a function for computing the current location of the host vehicle from the radio waves received from GPS (Global Positioning System) satellites, signals received from beacons installed on the road, etc. The first control unit 21 acquires current host vehicle location information computed by means of the function of the navigation device, and displays the map information for the vicinity of the current location of the host vehicle based on the acquired current location information. That is, the first control unit 21 continuously changes the content of the map information that is displayed in accordance with the changing travel location of the vehicle. In general, the amount of map information used in a vehicle navigation device is large, and continuously changing the display of such a large amount of information in accordance with the vehicle travel location places a considerable arithmetic processing load on the first control unit 21.

Moreover, information that changes the content to be displayed depending on the vehicle travel location includes vehicle periphery information. Vehicle periphery information is image data of the periphery of the host vehicle acquired by an imaging device mounted on the vehicle, which are image data that include objects around the host vehicle acquired by a camera attached, for example, to the upper part of the vehicle windshield or rear window, etc. The image data may be still or moving images. In addition, objects include obstacles that may affect the travel of the host vehicle, such as automobiles besides the host vehicle (other vehicles), motorcycles, bicycles, and pedestrians, as well as road lane boundaries, center lines, road markings, medians, guardrails, curbs, side walls of expressways, road signs, traffic lights, pedestrian crossings, construction sites, accident sites, and the like.

In addition, host vehicle periphery image data include image data acquired using a night-vision device, such as an infrared camera. During night driving, the first control unit 21 can generate image information emphasizing obstacles that are difficult to see with the naked eye based on image data acquired from the night-vision device, and display the image information on the first layer L1 in the form of so-called night vision. In addition, various information can be added to the host vehicle periphery image data using augmented reality (AR) technology. For example, the type of and proximity to the obstacle can be added to an obstacle detected from the image data. Specifically, for each detected obstacle, the proximity to the host vehicle is calculated and only obstacles whose proximity to the host vehicle is high, i.e., obstacles that are approaching the host vehicle, are displayed surrounded in red.

Such host vehicle periphery image data are displayed on the display unit 11 when the host vehicle parks in a parking space, when turning left or right at an intersection with poor visibility, when exiting a garage onto a road, or the like. In this case, in order to assist the driver, the image information displayed on the display unit 11 must be updated in real time, and thus the first control unit 21 requires a large number of calculations for the real-time image processing.

The information displayed on the first layer L1 may be information that changes in accordance with the vehicle travel state. Examples of information that changes in accordance with the vehicle travel state include the travel speed and acceleration of the vehicle, the engine rotation speed, the angular velocity of the vehicle, and the like. In particular, with regard to the travel speed of the vehicle, a speed limit is set for each road on which the host vehicle travels, and in order to prevent the travel speed of the host vehicle from exceeding the speed limit, the first control unit 21 is required to acquire detection results frequently from a detection device such as a vehicle speed sensor and to display the travel speed in real time. In addition, in order to maintain the engine rotation speed within a range that maximizes engine efficiency, the first control unit 21 preferably also frequently acquires detection results for the engine rotation speed from a detection device and displays the engine rotation speed in real time.

When controlling the display of information displayed on the first layer L1, the first control unit 21 can change the display portion for the information to be displayed on the first layer L1. For example, the display portion for the information displayed on the first layer L1 can be enlarged or reduced in size, or the transmittance of the display portion can be changed. In addition, the first control unit 21 can change at least one of the hue, brightness, and saturation of the display portion for the information to be displayed on the first layer L1 in accordance with the surrounding environment of the host vehicle. For example, if the host vehicle is traveling in a dark location, or when the host vehicle is traveling at night, the brightness of the displayed map information may be reduced. In addition, the first control unit 21 can change the background color of the map information to a color with low brightness, such as black or navy blue, or, conversely, change the background color of the map information to a color with high brightness, such as white.

Figure 6A:
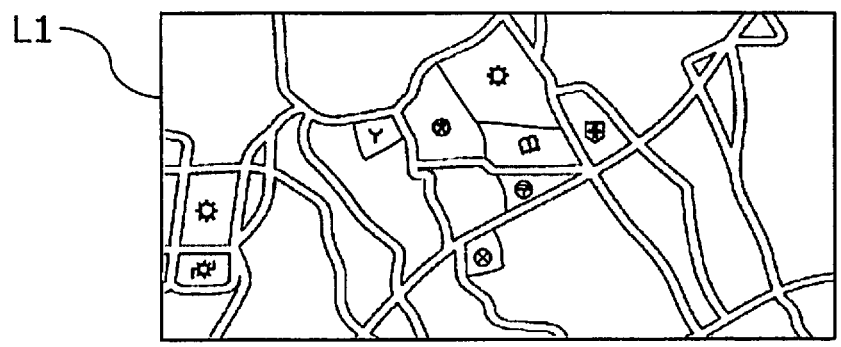
FIG. 6A is a diagram showing one example of information displayed on the first layer of FIG. 1.
Figure 6B:
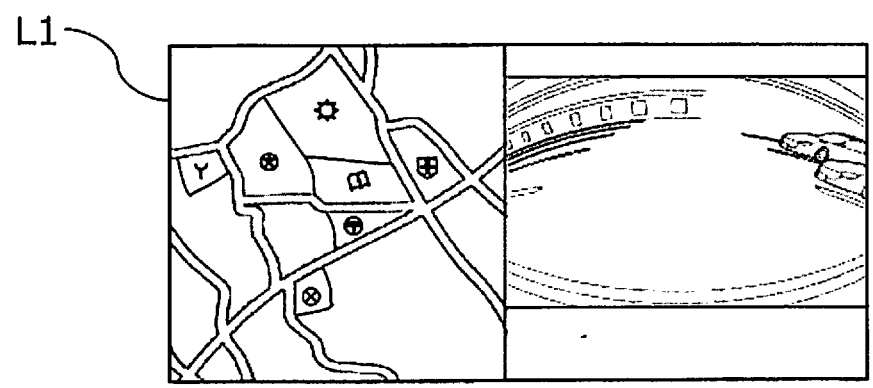
FIG. 6B is a diagram showing another example of information displayed on the first layer of FIG. 1.
Figure 6C:
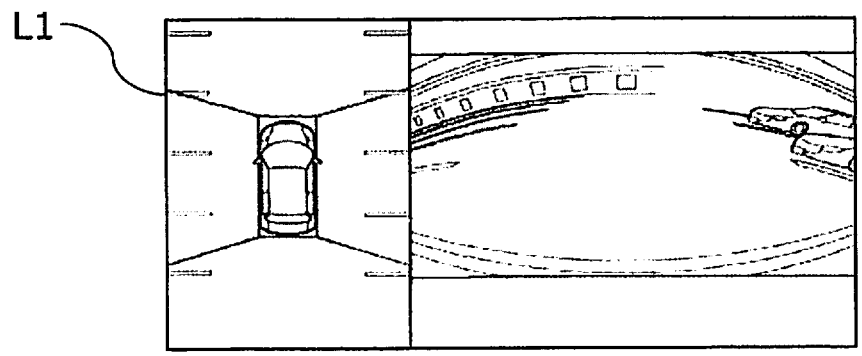
FIG. 6C is a diagram showing yet another example of information displayed on the first layer of FIG. 1.

For example, as shown in FIGS. 6A-6C, the first control unit 21 can change the content of the information displayed on the first layer L1 as well as the size of the information display portion. In FIG. 6A, only map information is displayed on the first layer L1, and in FIG. 6B, map information is displayed on the left side, and an image of the area in front of the host vehicle is displayed on the right side. In addition, in FIG. 6C, an image of the surroundings when the host vehicle in seen in a plan view is displayed on the left side, and an image of the area in front of the host vehicle is displayed on the right side. The first control unit 21 can switch the display of the first layer L1 by means of one of the display modes shown in FIGS. 6A, 6B, and 6C, in accordance with an operation input from the touch operation unit 12 and/or the input unit 13.

Returning to FIG. 4, the second control unit 22 has a function for controlling the display of information displayed on the second layer L2. A dummy background is displayed on the second layer L2. A dummy background is a background that is used for switching, in accordance with a user operation, between a state in which the user can see the information displayed on the first layer L1 (hereinafter also referred to as "first state") and a state in which the user cannot see the information displayed on the first layer L1 (hereinafter also referred to as "second state") in the display information generated by the superposing unit 3. When switching between the first state and the second state, the transmittance of the dummy background is changed. The relationship between the transmittance of the dummy background and the switching of the first and second states will be described with reference to FIGS. 7A and 7B.

Figure 7A:
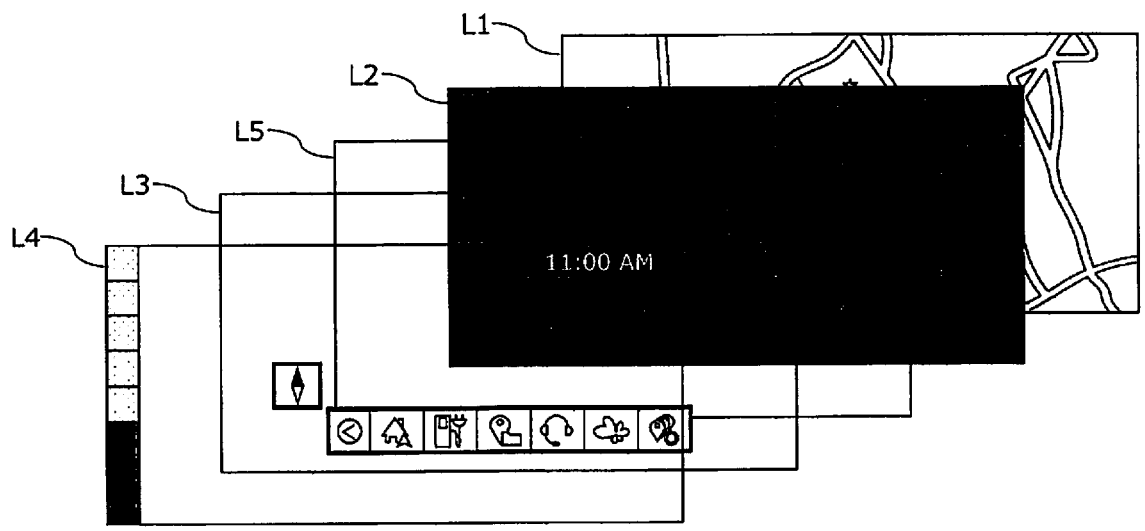
FIG. 7A is another example of information displayed on the first to the fifth layers of FIG. 1.
Figure 7B:
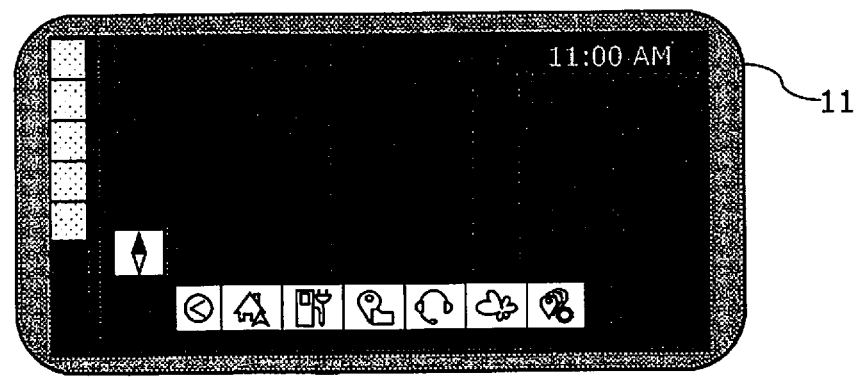
FIG. 7B is another example of information displayed on the display unit of FIG. 1.

FIG. 7A shows a case in which an opaque dummy background is displayed on the second layer L2 in FIG. 5A. Opaque means that the transmittance is in the range of 0-5%, for example. In this case, when the first layer L1 through the fifth layer L5 are superposed by means of the function of the superposing unit 3, the display information shown in FIG. 7B is generated and displayed on the display unit 11. In the display information shown in FIG. 7B, the map information displayed on the first layer L1 is hidden by the dummy background displayed on the second layer L2 and is not displayed on the display unit 11. That is, the state shown in FIG. 7B is the second state. Then, when a transparent dummy background is displayed on the second layer L2, that is, in the case shown in FIG. 5A, the map information is displayed on the display unit 11. This state is the first state. Here, transparent means that the transmittance is in the range of 95-100%. In this manner, by changing the transmittance of the dummy background displayed on the second layer L2, it is possible to control whether to display the information displayed on the first layer L1 on the display unit 11 without executing an effecting process with respect to the display portion for the information displayed on the first layer L1. That is, the display on the first layer L1 can be partially controlled without using the first control unit 21, which has a high arithmetic processing load, by using the second control unit 22.

The color of the dummy background is preferably a color with low brightness, such as black or navy blue, in order to suppress the occurrence of screen flicker. In addition, the rate at which the second control unit 22 changes the transmittance of the dummy background can be set to a prescribed value within a range capable of suppressing the occurrence of screen flicker, such as to a value with which, in accordance with the time required for an effecting process that is carried out in the third layer L3 and/or the fifth layer L5, the transmittance is changed to the transmittance after switching by the time the effecting process has been completed.

Figure 8A:
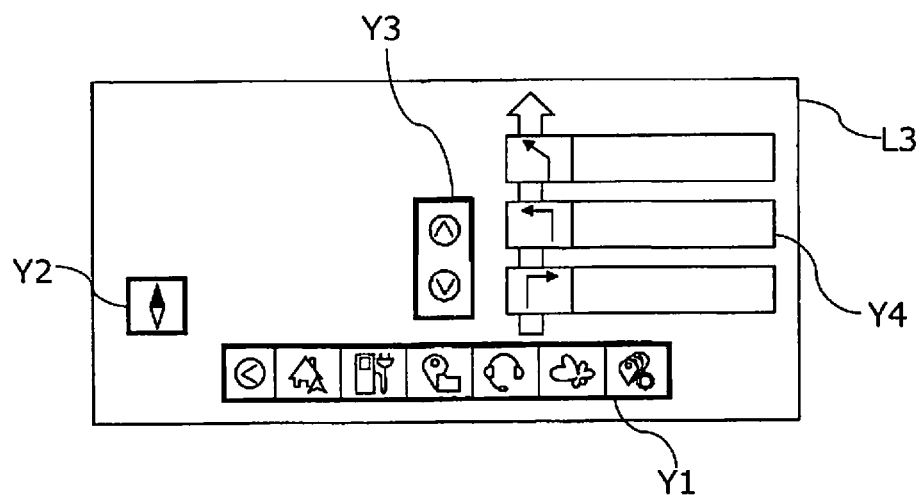
FIG. 8A is a diagram showing one example of information displayed on the third layer of FIG. 1.

Returning to FIG. 4, the third control unit 23 has a function for controlling the display of information displayed on the third layer L3. The third layer displays information other than the information displayed on the first layer L1. The information shown in FIGS. 8A and 8B can be displayed, for example; however, the information displayed on the third layer is not limited. FIG. 8A is a diagram showing information displayed on the third layer L3 primarily in the first state. In the first state, since map information or vehicle periphery information is displayed on the display unit 11, the information displayed on the third layer L3 is information used for controlling vehicle travel. Information Y1 displayed at the bottom of the third layer L3 in FIG. 8A is an image that includes icons for inputting an operation to the touch operation unit 12. The icons are, in order from the left, a screen return icon, an icon for setting the map information display to the host vehicle periphery of the current location, an electric vehicle charging facility search icon, a preset destination display icon, a hands-free telephone function activation icon, a music playback function activation icon, and an icon for opening a menu screen for changing the settings of the display of the display unit 11. Information Y2 displayed on the left side of the third layer L3 is an image representing a compass and indicates the bearing in the displayed map information. Information Y3 displayed in the central part of the third layer L3 is an image for changing the scale of the displayed map information; when the icon above is touched, the scale of the displayed map increases, and a wide-area map is displayed. When the icon below is touched, on the other hand, the scale of the displayed map decreases, and a detailed map is displayed. Information Y4 displayed on the right side of the third layer L3 is used for travel along a route set by the navigation device. For example, the user is notified of the distance to the next intersection, of left/right turn information at the next intersection, etc., using characters, symbols, icons, etc.

Figure 8B:
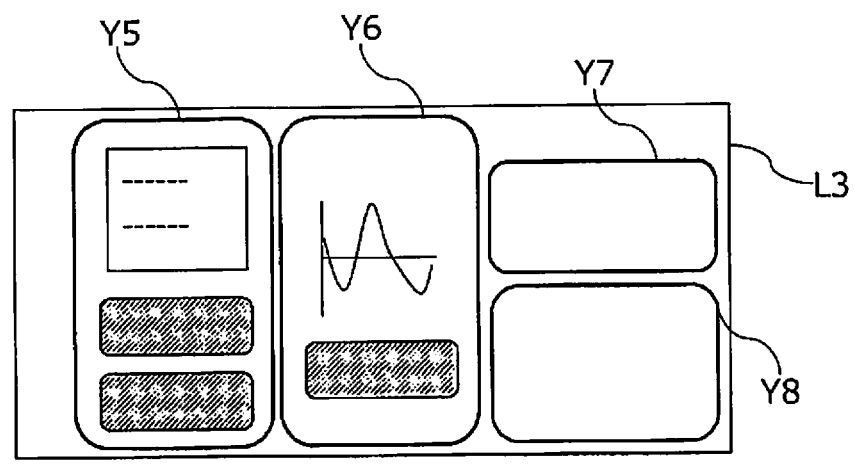
FIG. 8B is a diagram showing another example of information displayed on the third layer of FIG. 1.

On the other hand, FIG. 8B is a diagram showing information displayed on the third layer L3 primarily in the second state. In the second state, since map information or vehicle periphery information is not displayed on the display unit 11, the information displayed on the third layer L3 is information that is not used for controlling vehicle travel. For example, information Y5 displayed on the left side of the third layer L3 shows an application for playing music, and information Y6 displayed on the right side of the information Y5 shows an application displaying the power consumption of the vehicle. In addition, information Y7 and Y8 displayed on the right side of the third layer L3 is a button for activation of an application that controls a driving recorder, a button for connecting to user support, a button for activating artificial intelligence (AI) that supports the user by means of voice input, and the like. In addition to the information shown in FIGS. 8A and 8B, the third layer L3 displays information for controlling video playback, web browser information, information indicating the weather in the current location of the host vehicle and in the vicinity of the destination, etc.

When controlling the display of information displayed on the third layer L3, the third control unit 23 can change the display portion for the information to be displayed on the third layer L3. For example, the display portion for the information displayed on the third layer L3 can be enlarged or reduced in size, or the transmittance of the display portion can be changed. At this time, the size and transmittance of the display portion for the information to be displayed on the third layer L3 can be appropriately set within the range of ensuring the visibility of the information display portion. In addition, the third control unit 23 can change at least one of the hue, brightness, and saturation of the display portion for the information to be displayed on the third layer L3 in accordance with the surrounding environment of the host vehicle. For example, if the host vehicle is traveling in a dark location, or when the host vehicle is traveling at night, the brightness of the display portion for the information to be displayed may be reduced. As another example, the third control unit 23 can change the background color of the information displayed in the third layer L3 to a color with low brightness, such as black or navy blue, or, conversely, change the background color of the map information to a color with high brightness, such as white.

Returning to FIG. 4, the fourth control unit 24 has a function for controlling the display of information displayed on the fourth layer L4. The fourth layer L4 displays information other than the information displayed on the first layer L1, in similar fashion to the third layer L3. Here, the information displayed on the fourth layer L4 may be the same as or different from the information displayed on the third layer L3. However, unlike the third layer L3, when the switching unit 4 switches between the first state and the second state, an effecting process is not performed with respect to the display portion for the information displayed on the fourth layer L4. As a result, information that is displayed in both the first state and the second state is displayed on the fourth layer L4. In addition, the control of the display of information displayed on the fourth layer L4 by the fourth control unit 24 can be carried out in the same manner as the control of the display of information displayed on the third layer L3 by the third control unit 23. The fourth control unit 24 and the fourth layer L4 are not indispensable configurations, but may be provided as deemed necessary.

Figure 9A:
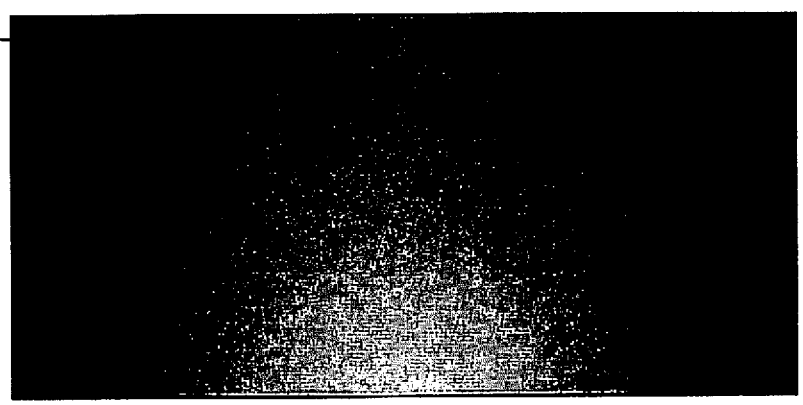
FIG. 9A is a diagram showing one example of information displayed on the fifth layer of FIG. 1.
Figure 9B:
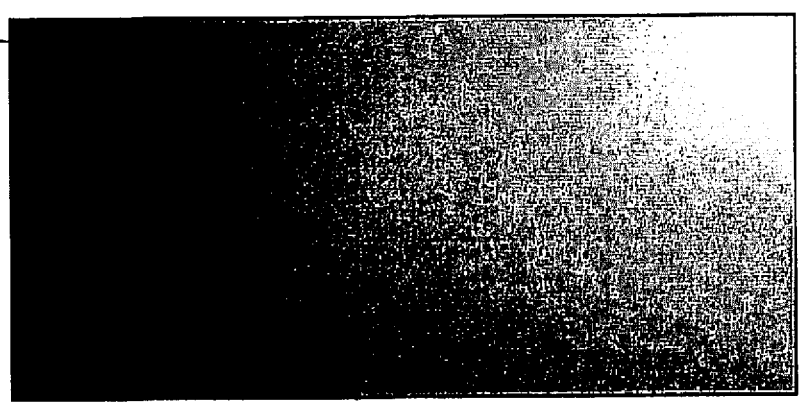
FIG. 9B is a diagram showing another example of information displayed on the fifth layer of FIG. 1.

The fifth control unit 25 has a function for controlling the display of information displayed on the fifth layer L5. The fifth layer L5 displays a background, part of which is of greater brightness than the other parts. By differing the brightness of a single background image, it is possible to realize a visual effect as if a spotlight were shone on a part of the display information displayed on the display unit 11. The fifth control unit 25 can appropriately set the brightness of the background depending on which part of the display information is used to realize the above-described spotlight visual effect. For example, as shown by the image in FIG. 9A, if the brightness is set to be greatest at the lower center part, decreasing from there radially, it is possible to obtain the visual effect of a spotlight being shone on the lower central part. In addition, when it is desired to obtain a visual effect as if a spotlight were shone on the upper right of the display information, as shown by tee image in FIG. 9B, the brightness is set to be greatest at the upper right, and a gradation is applied so that the brightness decreases from there radially.

In order to realize a visual effect as if a spotlight were being shone, the color of the background displayed on the fifth layer L5 is preferably a color of low brightness, such as black or navy blue. When controlling the display of information displayed on the fifth layer L5, the fifth control unit 25 can change the transmittance of the background displayed on the fifth layer L5. Specifically, in the first state, the transmittance of the background displayed on the fifth layer L5 is set to 100%, for example, in order to display the information displayed on the first layer L1 on the display unit 11. In the second state, on the other hand, the transmittance of the background displayed on the fifth layer L5 is set to 0%, for example, in order not to display the information displayed on the first layer L1 on the display unit 11. The fifth control unit 25 and the fifth layer L5 are not indispensable configurations, but may be provided as deemed necessary.

In the foregoing, the first control unit 21 through the fifth control unit 25 and the first layer L1 through the fifth layer L5 were described, but it is not necessary for a control unit to be provided for each of the first layer L1 through the fifth layer L5, as shown in FIG. 4, and one control unit may control the display of a plurality of layers. For example, the configuration may be such that the fourth control unit 24 and the fifth control unit 25 are not provided, the first control unit 21 controls the display of information on the first layer L1, the second control unit 22 controls the display of information on the second layer L2 and the fifth layer L5, and the third control unit 23 controls the display of information on the third layer L3 and the fourth layer L4. In addition, the configuration may be such that the third control unit 23, the fourth control unit 24, and the fifth control unit 25 are not provided, the first control unit 21 controls the display of information on the first layer L1, the second control unit 22 controls the display of information on the second layer L2 through the fifth layer L5, the first control unit 21 controls the display of information on the first layer L1 and the second layer L2, and the second control unit 22 controls the display of information on the third layer L3 through the fifth layer L5. Thus, because a single control unit can control the display of a plurality of layers, the computational load of each control unit can be optimized, and it becomes possible to suppress an increase in the number of control units.

Switching States

Switching between the first state and the second state by the switching unit 4 will now be described. The switching unit 4 has a function for switching, in accordance with the user operation, between the first state (a state in which the dummy background is transparent and the user can see the information displayed on the first layer L1 in the display information), and the second state (a state in which the dummy background is opaque and the user cannot see the information displayed on the first layer L1 in the display information). As shown in FIG. 4, the first control unit 21 through the third control unit 23 and the fifth control unit 25 are connected to the switching unit 4. During execution of the display switching process via the first control unit 21 through the third control unit 23 and the fifth control unit 25, the switching unit 4 controls the display of information on the first layer L1 through the third layer L3 and the fifth layer L5, thereby performing a display switching process.

The fourth control unit 24 is not connected to the switching unit 4. This is because, as described above, the display of the information displayed on the fourth layer and controlled by the fourth control unit 24 is not changed during the display switching process that is carried out by the switching unit 4.

When the switching unit acquires an operation input from at least one of the touch operation unit 12, the first input unit 13a, or the second input unit 13b from the control unit 2, the switching unit 4 executes the display switching process. In the display switching process, the switching unit 4 first switches the display without executing the effect processing on the information display portion displayed on the first layer L1 while switching between the first state and the second state, and controls the display of the information on the first layer L1 such that the display portion does not change while the display switching process is executed. The effecting process with respect to the display portion for the information displayed on the first layer L1 is to produce at least one of a switch between the first state and the second state, an ending of the state before the switch, and a starting of the state after the switch. That is, when switching from the first state to the second state, at least one effecting process that adds the visual effect showing at least one of the end of the first state, the start of the second state, and a switch from the first state to the second state is executed. And when switching from the second state to the first state, at least one effecting process that adds the visual effect of the end of the second state, the visual effect of the start of the first state, and the visual effect of a switch from the second state to the first state, is executed.

An effecting process that adds the visual effect of the end of the state before the switch is, for example, deleting the display portion for the information that was displayed in the state before the switch. An effecting process that adds the visual effect of the start of the state after the switch is, for example, causing the display portion for the information to be displayed in the state after the switch to appear. An effecting process that adds the visual effect of a switch between the first state and the second state is, for example, displaying information indicating to the user that a transition to a different state will occur, after the display portion for the information displayed in the state before the switch is deleted and before the display portion for the information to be displayed in the state after the switch appears. An effecting process means, for example, changing the display portion for the information displayed on the first layer L1, and particularly includes enlarging and reducing the size of the display portion, changing the transmittance of the display portion, changing the hue, brightness, and saturation of the display portion for the information to be displayed, and the like. Specifically, it means changing the display mode shown in FIGS. 6A-6C. As a result, it is possible to suppress an increase in the computational load on the first control unit 21 while the display switching process is being executed.

When executing the display switching process, the switching unit 4 at least confirms, via the control unit 2, that it is possible to control the display portion for the information displayed on the first layer L1, that it is possible to change the transmittance of the dummy background of the second layer L2, and that it is possible to execute an effecting process with respect to the display portion for the information displayed on the third layer L3. Then, after it is confirmed that the display of information on the first layer L1, the second layer L2, and the third layer L3 can be appropriately controlled, the first state and the second state are switched. In addition to confirming that it is possible to control the display portion for the information displayed on the first layer L1, that it is possible to change the transmittance of the dummy background of the second layer L2, and that it is possible to execute an effecting process with respect to the display portion for the information displayed on the third layer L3, the switching unit 4 may also confirm, via the control unit 2, that it is possible to change the background of the fifth layer L5. As a result, it is possible to suppress the occurrence of situations in which screen flickering occurs due to in appropriate control of the display of certain layers.

The information display portion of the first layer L1 is maintained but the content of the displayed information may change while the first state and the second state are switched. For example, as shown in FIG. 6A, if map information is displayed on the first layer L1, when executing a display switching process, the switching unit 4 does not change the display mode of the first layer L1 to that shown FIG. 6B or that shown in FIG. 6C, but changes the content of the map information displayed on the first layer L1 in accordance with the vehicle travel location. As another example, as shown in FIG. 6B, if map information and vehicle periphery information are displayed on the first layer L1, when executing a display switching process, the switching unit 4 maintains the display mode of the first layer L1, and changes the contents of the map information and the vehicle periphery information displayed on the first layer L1 in accordance with the vehicle travel location.

Alternatively, the switching unit 4 carries out a control such that the display portion for the information on the first layer L1 and the content of the displayed information do not change while the first state and the second state are switched. For example, as shown in FIG. 6A, if map information is displayed on the first layer L1, when executing a display switching process, the switching unit 4 carries out a control such that the display mode of the first layer L1 and the content of the map information displayed on the first layer L1 do not change. As another example, as shown in FIG. 6B, if map information and vehicle periphery information are displayed on the first layer L1, when executing a display switching process, the switching unit 4 maintains the display mode of the first layer L1, and also carries out a control such that the content of the map information displayed on the first layer L1 and the vehicle periphery information do not change, even if the vehicle travel location changes.

In addition, the switching unit 4 changes the transmittance of the dummy background displayed on the second layer L2 to that of the state after the switch, while the first state and the second state are switched. That is, when switching from the first state to the second state, the transmittance of the dummy background is changed from 100% to 0%, for example, and when switching from the second state to the first state, the transmittance of the dummy background is changed from 0% to 100%, for example. As a result, by changing the transmittance of the dummy background displayed on the second layer L2, it is possible to partially control the display of the information on the first layer L1. The rate at which the transmittance is changed can be set to an appropriate value within a range capable of suppressing the occurrence of screen flicker. In addition, the transmittance may be changed so as to be synchronized with the execution of an effecting process with respect to the display portion for the information displayed on the third layer L3 by the switching unit 4, described further below.

Additionally, the switching unit 4 executes at least one effecting process, from among the switch between the first state and the second state, ending the state before the switch, and starting the state after the switch, with respect to the display portion for the information displayed on the third layer L3 in the first state and/or the display portion for the information displayed on the third layer L3 in the second state, while switching between the first state and the second state. For example, when switching from the first state to the second state, in the first state an effecting process for the end of the first state is executed with respect to the display portion for the information displayed on the third layer L3, and in the second state an effecting process for the start of the second state is executed with respect to the display portion for the information to be displayed on the third layer L3. In addition, an effecting process for the switch from the first state to the second state is executed after executing an effecting process for the end of the first state and before executing the effecting process for the start of the second state. On the other hand, when switching from the second state to the first state, in the second state an effecting process for the end of the second state is executed with respect to the display portion for the information displayed on the third layer L3, and in the first state an effecting process for the start of the first state is executed with respect to the display portion for the information to be displayed on the third layer L3. In addition, an effecting process for the switch from the second state to the first state is executed after executing an effecting process for the end of the second state and before executing the effecting process for the start of the first state.

The effecting process means, for example, changing the display portion for the information displayed on the third layer L3, and specifically is an effecting process including at least one from among moving, shrinking, enlarging, and changing the transmittance of the display portion for the information displayed on the third layer L3. In this manner, by executing an effecting process with respect to the display portion for the information displayed on the third layer L3, it is possible to execute a visual effect that increases user satisfaction and changes the display of information, while suppressing the occurrence of screen flicker, even without executing an effecting process with respect to the display portion for the information displayed on the first layer L1. Additionally, it is possible to suppress an increase in the computational load on the first control unit 21.

In addition, when switching between the first state and the second state, the switching unit 4 erases, with the passage of time, the display portion for the information displayed in the state before the switch, and causes, with the passage of time, the display portion for the information to be displayed in the state after the switch to appear. That is, when switching from the first state to the second state, the switching unit 4 erases, with the passage of time, the display portion for the information displayed in the first state, and causes, with the passage of time, the display portion for the information to be displayed in the second state to appear. In addition, when switching from the second state to the first state, the switching unit 4 erases, with the passage of time, the display portion for the information displayed in the second state over time, and causes, with the passage of time, the display portion for the information to be displayed in the first state to appear. The time required for the information display portion to be erased or to appear can be appropriately set within the range of the time for the user to be able to recognize the visual effect, which is, for example, 0.5 to 10 seconds.

Figure 10A:
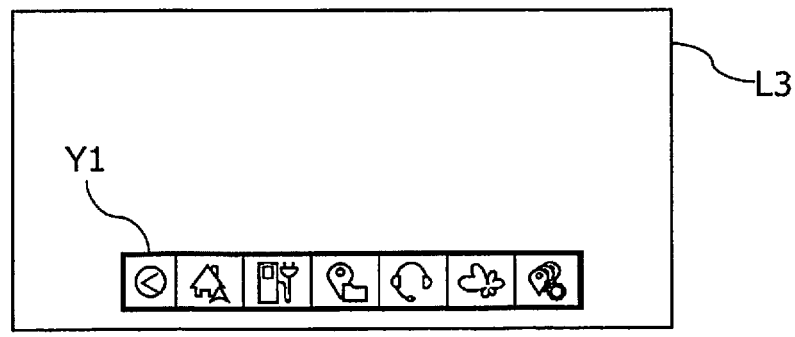
FIG. 10A is a diagram showing one example of an effecting process executed with the switching unit of FIG. 1 (part 1).
Figure 10B:
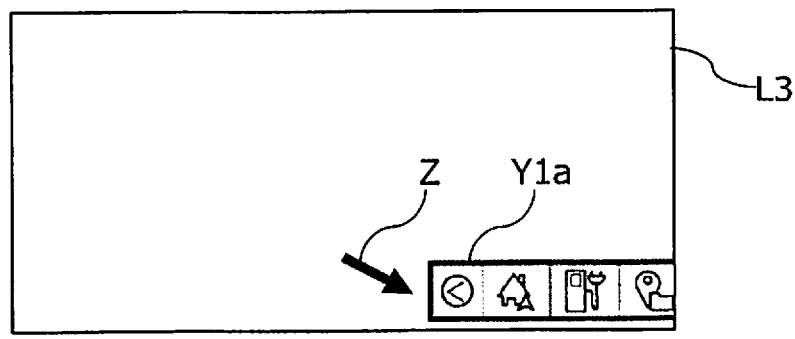
FIG. 10B is a diagram showing one example of an effecting process executed in the switching unit of FIG. 1 (part 2).
Figure 10C:
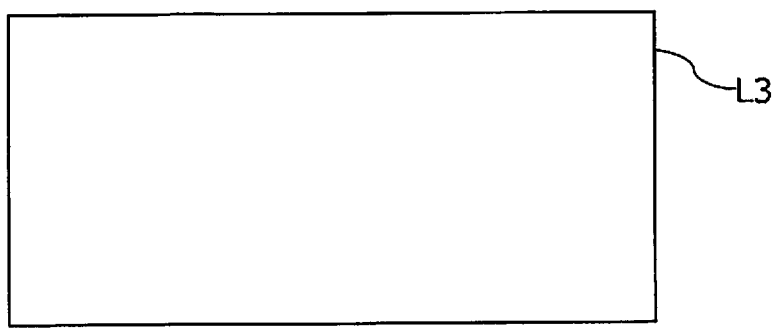
FIG. 10C is a diagram showing one example of an effecting process executed in the switching unit of FIG. 1 (part 3).

Examples of the effecting process executed by means of the function of the switching unit 4 are shown in FIGS. 10A to 10C. FIGS. 10A-10C show how the display portion for the information Y1 displayed on the third layer L3 changes when executing an effecting process with respect to the display portion for the information Y1, in which the display portion is moved to the lower right of the third layer L3 and the transmittance of the display portion is increased. In FIG. 10A, it is assumed that the information Yb is displayed at the bottom of the third layer L3 in the first state. When the effecting process of this example is executed by the switching unit 4, the transmittance of the display portion for the information Y1 increases. Then, as the transmittance increases, the information Y1 moves in parallel toward the lower right. FIG. 10B shows information Y1$a$ while the effecting process is being executed. Compared to the display portion for the information Y1 shown in FIG. 10A, the transmittance of the information Y1$a$ shown in FIG. 10B has increased. Whereas the transmittance of the display portion for the information Y1 is 0-5%, for example, the transmittance of the display portion for the information Y1$a$ is 30-60%, for example. In addition, the display portion for the information Y1$a$ shown in FIG. 10B has moved in parallel in the direction of arrow Z from the position where the information Y1 is displayed in FIG. 10A. When the effecting process by the switching unit 4 is completed, the information Y1 is no longer displayed on the third layer L3, as shown in FIG. 10C. By means of the effecting process of this example, a visual effect as if the information Y1 disappears from the lower right direction of the third layer L3 is obtained.

On the other hand, the above-described effecting process may be executed in reverse order to obtain a visual effect as if the information Y1 appears from the lower right position of the third layer L3. That is, in a state in which no information is displayed on the third layer L3, as shown in FIG. 10C, the display portion for the information Y1 is moved from the lower right position of the third layer L3 toward the direction opposite to the arrow Z shown in FIG. 10B. During the parallel movement, the transmittance of the information Y1 is decreased. Then, the display portion for the information Y1 is stopped at the position of FIG. 10A, and the transmittance is set to 0%, for example.

In the effecting process shown in FIGS. 10A to 10C, the display portion for the information Y1 is moved in parallel, but the movement is not limited to a parallel movement; it may be rotational movement, or a combination of a rotational movement and a parallel movement. In addition, the display portion for the information Y1 may be enlarged or reduced in size while the display portion for the information Y1 is being moved. In the effecting process shown in FIGS. 10A-10C, when obtaining a visual effect as if the information Y1 disappears in the lower right direction of the third layer L3, the visual effect is further emphasized if the display portion for the information Y1 is reduced in size during the parallel movement shown in FIG. 10B. On the other hand, when obtaining a visual effect as if the information Y1 appears from the lower right direction of the third layer L3, the visual effect is further emphasized if information Y1 reduced in size is displayed first, and the size of the display portion for the information Y1 is gradually enlarged during the move to the position shown in FIG. 10A.

Figure 11A:
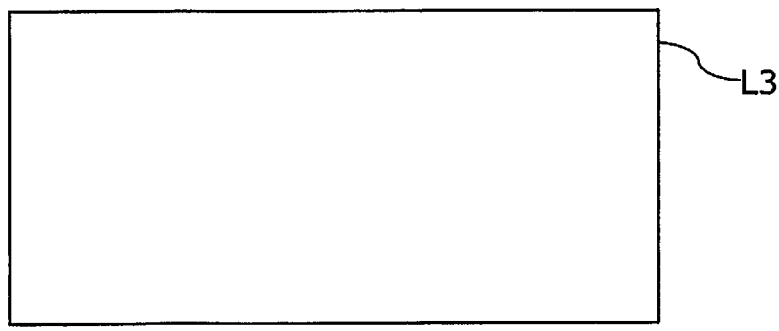
FIG. 11A is a diagram showing another example of an effecting process executed in the switching unit of FIG. 1 (part 1).
Figure 11B:
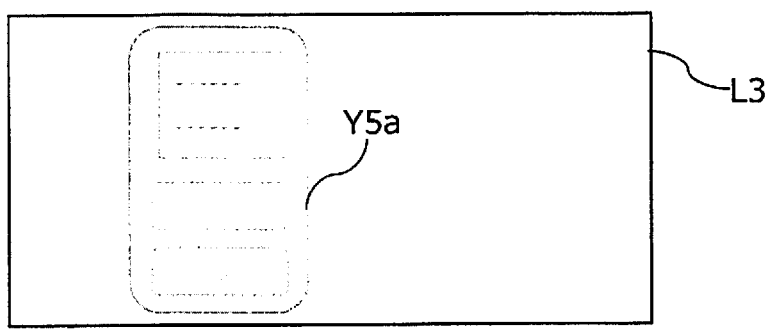
FIG. 11B is a diagram showing another example of an effecting process executed in the switching unit of FIG. 1 (part 2).
Figure 11C:
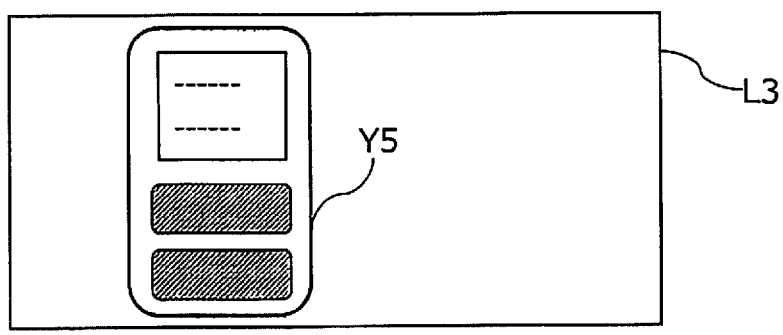
FIG. 11C is a diagram showing another example of an effecting process executed in the switching unit of FIG. 1 (part 3).

FIGS. 11A-11C are diagrams showing other examples of an effecting process executed by means of the function of the switching unit 4. FIG. 11A-11C show how the display portion for the information Y5 displayed on the third layer L3 changes when executing an effecting process with respect to the display portion for the information Y5 in which the transmittance of the display portion is changed. In FIG. 11A, it is assumed that information is not displayed on the third layer L3 during a switch from the first state to the second state. In the state of FIG. 11A, when the effecting process is executed by the switching unit 4, the information Y5 having a high transmittance is displayed in the position where the information Y5 is displayed. For example, information Y5a as shown in FIG. 11B is displayed, and the transmittance thereof is about 30-60%. When the transmittance is decreased further and the effecting process by the switching unit 4 is completed, the information Y5 is displayed on the third layer L3, as shown in FIG. 11C. By means of the effecting process of this example, a visual effect as if the display portion for the information Y5 fades in onto the third layer L3 is obtained. Conversely, in order to fade out the display portion for the information Y5 from the third layer L3, the transmittance of the display portion for the information Y5 is gradually increased from a state in which the transmittance is 0-5% (FIG. 11C), via a state in which the transmittance is 30-60% (FIG. 11B), ultimately to a state in which the transmittance is 100%, as shown in FIG. 11A. The rate at which the transmittance of the display portion is changed can be set to an appropriate rate within a range with which the user is able to recognize the fade-in and fade-out visual effects of the information display portion.

In addition, the switching unit 4 executes an effecting process with respect to the display portion for the information displayed on the third layer L3 in the state before the switch, and after the display portion for the information displayed on the third layer L3 in the state before the switch can no longer be seen by the user in the display information, executes an effecting process with respect to the display portion for the information to be displayed on the third layer L3 in the state after the switch. For example, when switching from the first state to the second state, the effecting process shown in FIGS. 10A-10C is executed, and when the information Y1 is no longer displayed on the display unit 11, the effecting process shown in FIGS. 11A-11C is executed, thereby displaying the information Y5 on the third layer L3. Conversely, when switching from the second state to the first state, the effecting process shown in FIGS. 11A-11C is executed, and the display portion for the information Y5 is made to fade out from the third layer L3, after which the effecting process shown in FIGS. 10A-10C is executed, and the display portion for the information Y1 is made to appear from the lower right position of the third layer L3.

Figure 12:
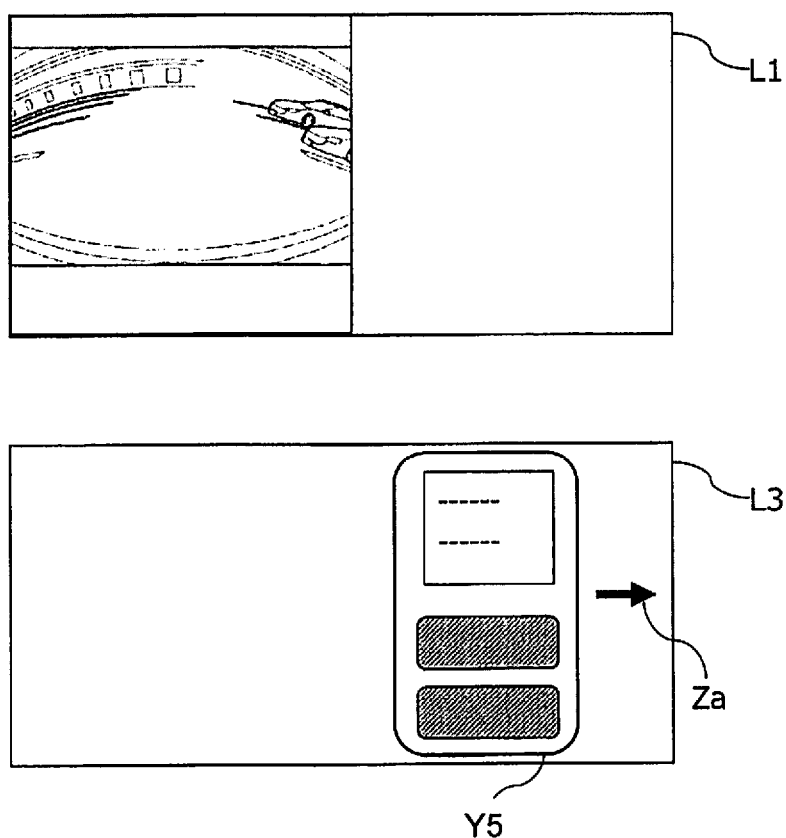
FIG. 12 is a diagram showing yet another example of an effecting process executed in the switching unit of FIG. 1.

In addition, the switching unit 4 moves the display portion for the information displayed on the third layer L3 so as not to overlap the map information and the image information displayed on the first layer L1. For example, as shown in FIG. 12, in the case that the host vehicle periphery information is displayed on the left side of the first layer L1 and the information Y5 showing an application for playing music is displayed on the right side of the third layer L3, when executing an effecting process in which the information Y5 disappears from the third layer L3, the display portion for the information Y5 is moved in the direction of arrow Za shown in FIG. 12. As a result, during display on the display unit 11, it is possible to prevent the occurrence of a situation in which the display portion for the information Y5 crosses over the host vehicle periphery information, making it impossible for the user to visually recognize the host vehicle periphery information.

In the foregoing, each function block included in the control device 14 was described, but it is not necessary for a single control device 14 have all function blocks, and some of the above-described function blocks may be provided in another device included in the vehicle display device 1 or another information processing device that is not shown. In addition, it is not necessary to execute all of the processes of the function blocks in a single device; the functions of the function blocks may be realized in a plurality of devices that are connected to each other in a state in which it is possible to send and receive data. For example, in the vehicle display device 1 of FIG. 1, of the processes executed by the superposing unit 3, some of the processes may be executed by the display unit 11 and the remaining processes may be executed by the superposing unit 3. In this case, the CPU, ROM, and RAM of the display unit 11 are used in order to carry out some of the processes for realizing the function of the superposing unit 3.

Processes in the Vehicle Display Device

The procedure used when the control device 14 processes information will be described with reference to FIGS. 13A-13E. FIGS. 13A-13E are examples of flowcharts showing the information processing in the vehicle display device 1 of the present embodiment. The processes described below are executed when the processor 15 of the control device 14 switches the display from the first state to the second state.

In addition, in the following description, it is assumed that in the first state before the routines shown in FIGS. 13A-13E are executed, each layer displays the information shown in FIG. 14A. That is, an image of buttons for touch operation is displayed on the left side, and a clock is displayed on the upper right side of the fourth layer L4. It is assumed that an image with icons for changing the display of the display unit 11 is displayed on the third layer L3. In addition, nothing is displayed on the fifth layer L5 and the second layer L2, and map information is displayed on the first layer L1. In this case, the display information generated by the superposing unit 3 is the information shown in FIG. 14B. That is, the display state is such that the user can see the map information on the display unit 11, and the information displayed on the third layer L3 and the fourth layer L4 is displayed over the map information.

Figure 13A:
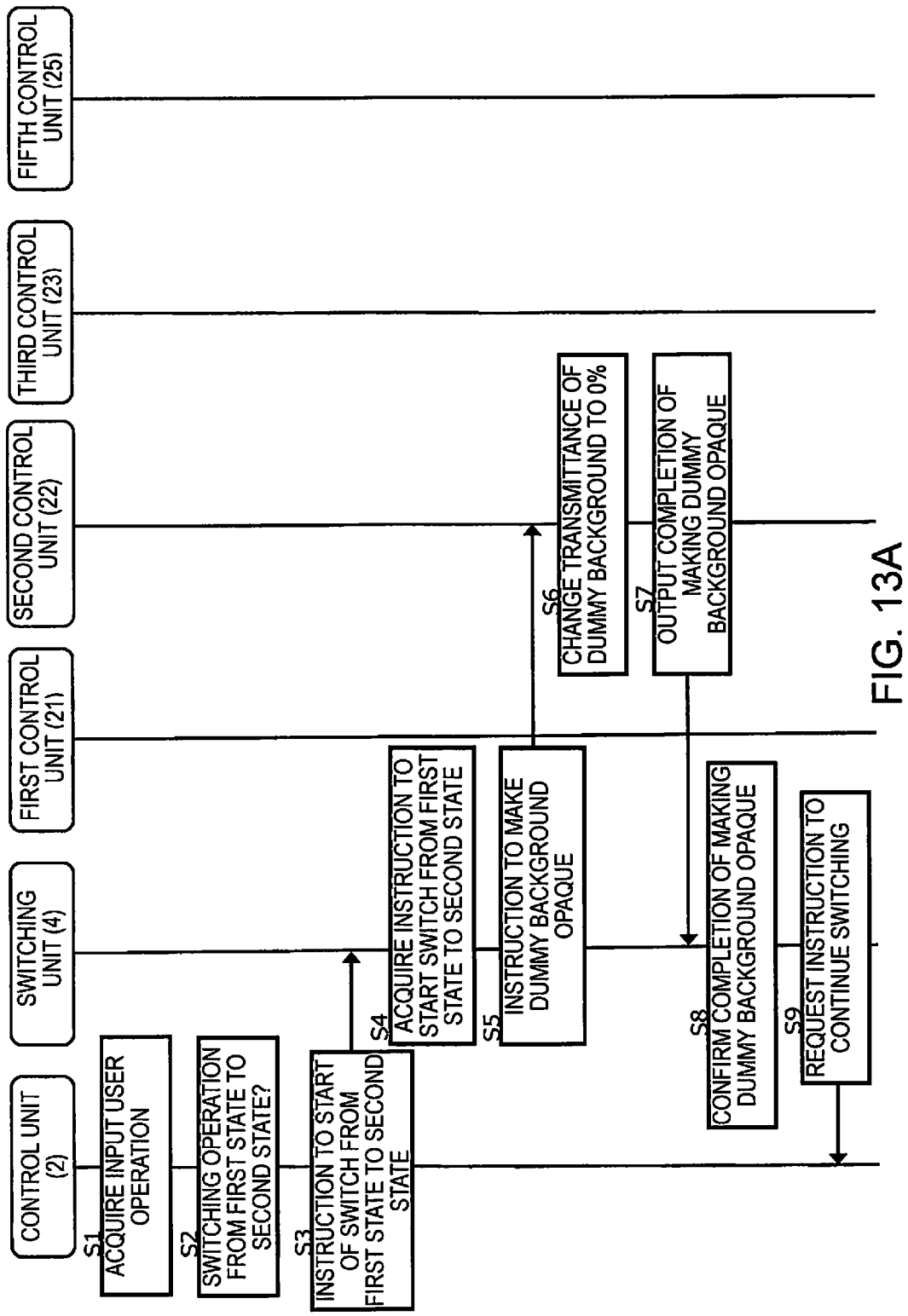
FIG. 13A is a flowchart showing one example of an information processing procedure carried out by the vehicle display device of FIG. 1 (part 1).
Figure 14A:
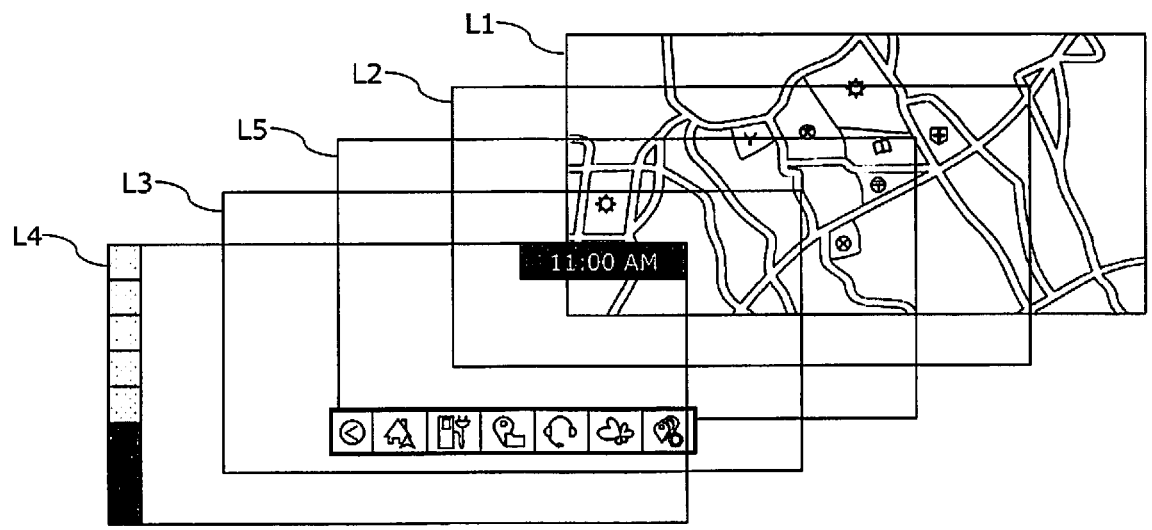
FIG. 14A is one example of information displayed on each layer in Step S1 of FIG. 13A.
Figure 14B:
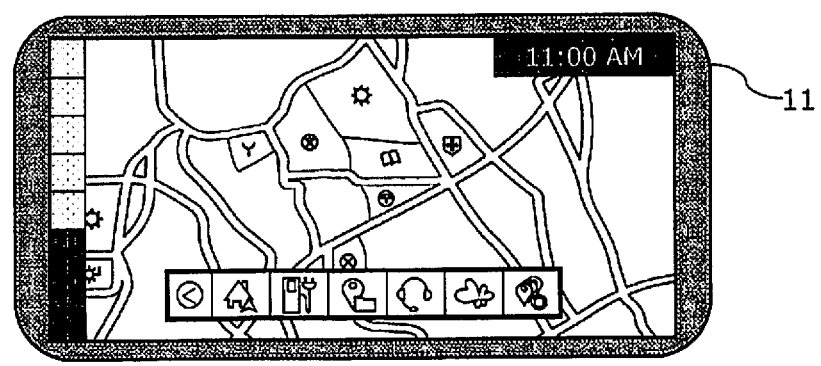
FIG. 14B is one example of information displayed on the display unit in Step S1 of FIG. 13A.

First, in Step S1 of FIG. 13A, by means of the function of the control unit 2, the user operation input from the touch operation unit 12 and/or the input unit 13 is acquired, and in the next Step S2, it is determined whether the acquired operation is an operation to switch the first state to the second state. If the acquired operation is not an operation to switch the first state to the second state, the execution of the routine is stopped and the processing by the control device 14 is ended. On the other hand, if the acquired operation is an operation to switch the first state to the second state, the process proceeds to Step S3, and, by means of the function of the control unit 2 as the master device, the switching unit 4 is instructed to start switching from the first state to the second state.

In Step S4, the switching unit 4 acquires the instruction to start switching from the first state to the second state. In the next Step S5, the switching unit 4 outputs an instruction to the second control unit 22 to make the dummy background of the second layer L2 opaque by means of the function for switching between the first state and the second state. In Step S6, the second control unit 22 changes the transmittance of the dummy background of the second layer L2, for example, from 100% (transparent state) to 0% (opaque state) by means of the function for controlling the display of information on the second layer L2.

Figure 15A:
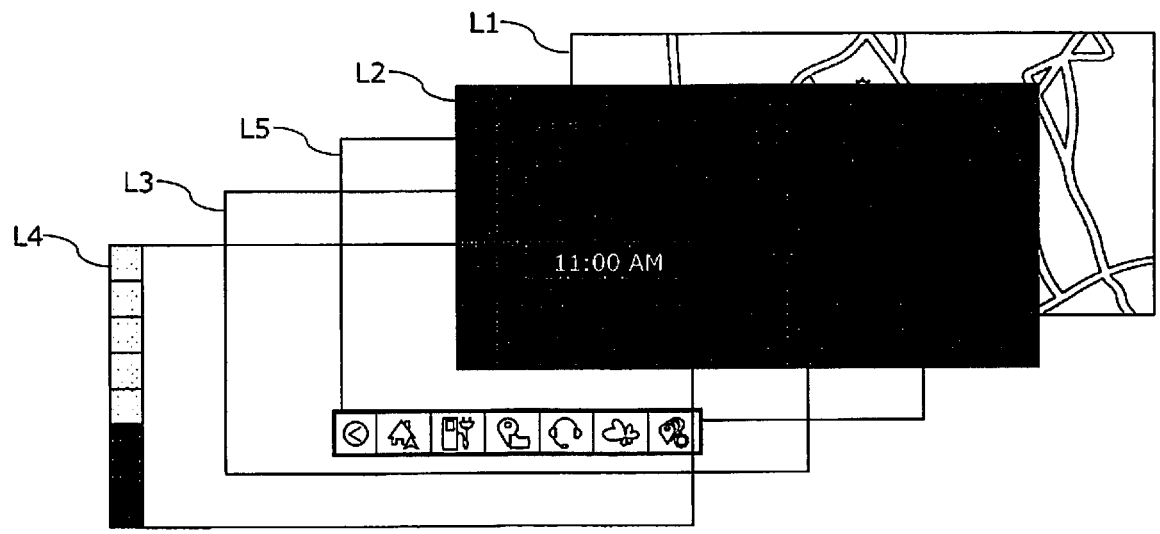
FIG. 15A is one example of information displayed on each layer in Step S6 of FIG. 13A.
Figure 15B:
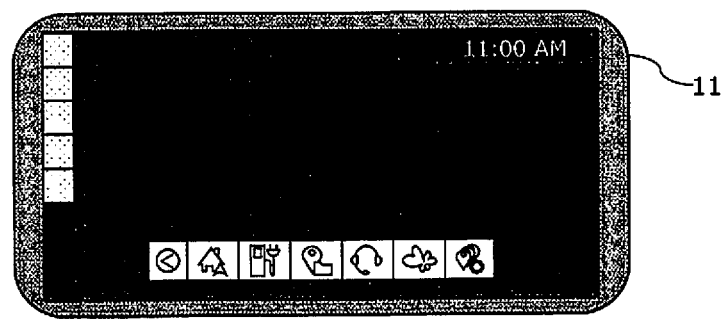
FIG. 15B is one example of information displayed on the display unit in Step S6 of FIG. 13A.

In Step S6, for example, information shown in FIG. 15A is displayed on each layer. That is, an image of buttons for touch operation is displayed on the left side, and a clock is displayed on the upper right side of the fourth layer L4. An image with icons for changing the display of the display unit 11 is displayed on the third layer L3. Nothing is displayed on the fifth layer L5, and an opaque dummy background is displayed on the second layer L2. In addition, map information is displayed on the first layer L1. In this case, the display information generated by the superposing unit 3 is the information shown in FIG. 15B. That is, the display state is such that the user cannot see the map information on the display unit 11, since it is hidden behind the dummy background. The information displayed on the third layer L3 and the fourth layer L4 is displayed over the dummy background.

Returning to FIG. 13A, in Step S7, the second control unit 22 outputs, to the switching unit 4, the fact that the dummy background has been made opaque by means of the function for controlling the display of information on the second layer L2. In Step S8, the switching unit 4 acquires the output of the second control unit 22 and confirms that the dummy background has become opaque. In the next Step S9, the switching unit 4 requests the control unit 2 to issue an instruction to continue the display switching process by means of the function for switching between the first state and the second state. Note that Step S8 is not an indispensable step and may be provided as needed.

Figure 13B:
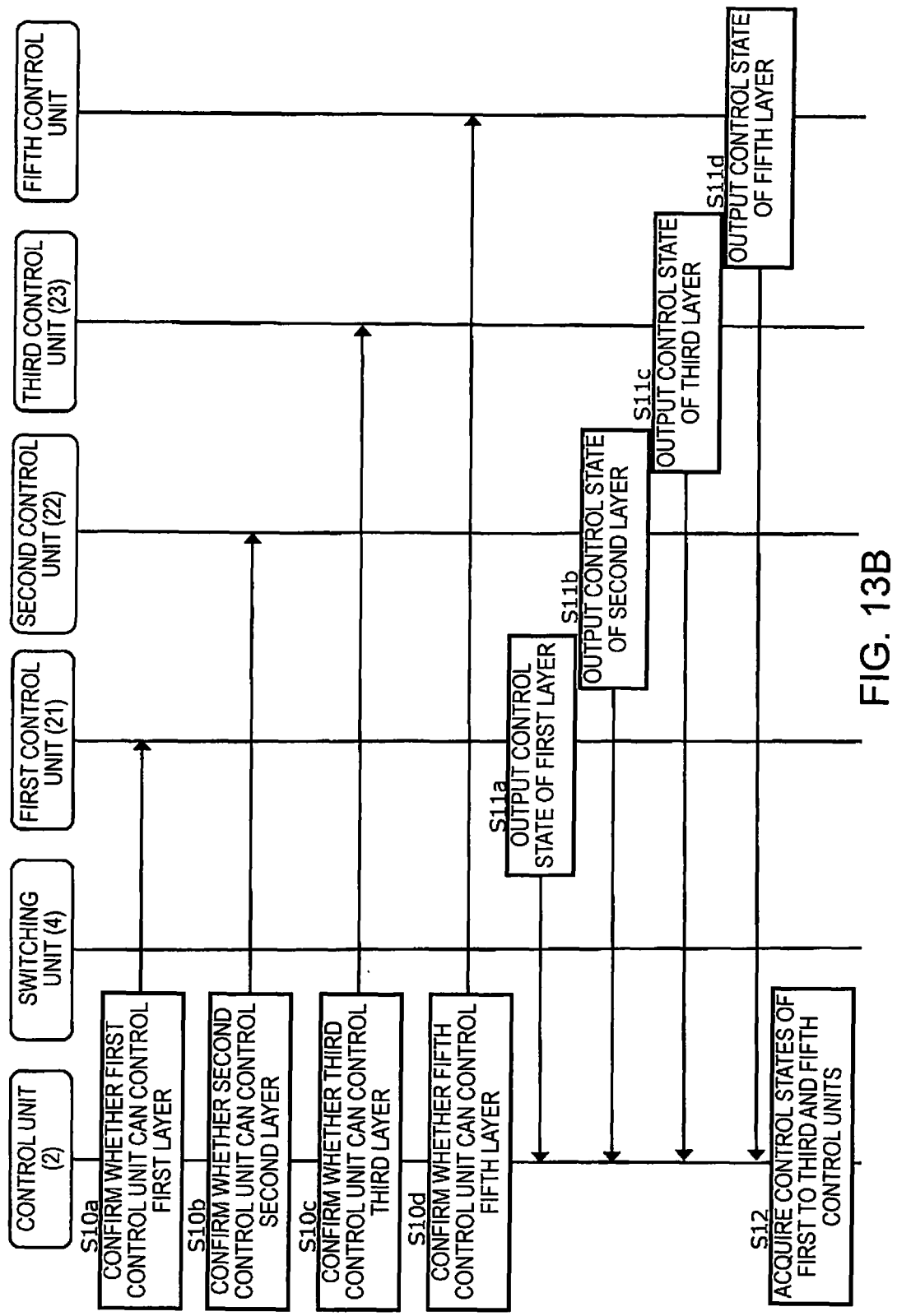
FIG. 13B is a flowchart showing one example of an information processing procedure carried out in the vehicle display device of FIG. 1 (part 2).

Proceeding to FIG. 13B, the control unit 2, requested by the switching unit 4 to issue an instruction to continue the display switching process, confirms, by means of the function of the control unit 2 as the master device, whether each control unit is able to control the display of information on the layers. Specifically, in Step S10a, the control unit 2 confirms whether the first control unit 21 can control the display of information on the first layer L1. In the next Step S10b, the control unit 2 confirms whether the second control unit 22 can control the display of information on the second layer L2. In the next Step S10c, the control unit 2 confirms whether the third control unit 23 can control the display of information on the third layer L3. In the next Step S10d, the control unit 2 confirms whether the fifth control unit 25 can control the display of information on the fifth layer L5. Steps S10a-S10d may be executed sequentially, as shown in FIG. 13b, or at the same timing (for example, simultaneously).

Each control unit, the information display control state of which has been confirmed, outputs the information display control state for the respective layer to the control unit 2 by means of the function for controlling the control of the display of information on the layer. Specifically, in Step S11a, the first control unit 21 outputs the information display control state for the first layer L1. In the next Step S11b, the second control unit 22 outputs the information display control state for the second layer L2. In the next Step S11c, the third control unit 23 outputs the information display control state for the third layer L3. In the next Step S11d, the fifth control unit 25 outputs the information display control state for the fifth layer L5. The order in which Steps S11a-S11d is executed is not limited to what is shown in FIG. 13B; the order in which each steps is processed may be changed, or a plurality of steps may be executed at the same timing (for example, simultaneously). In the next Step S12, the control unit 2 acquires the outputs from the first control unit 21 through the third control unit 23 and the fifth control unit 25 by means of the master device function.

Figure 13C:
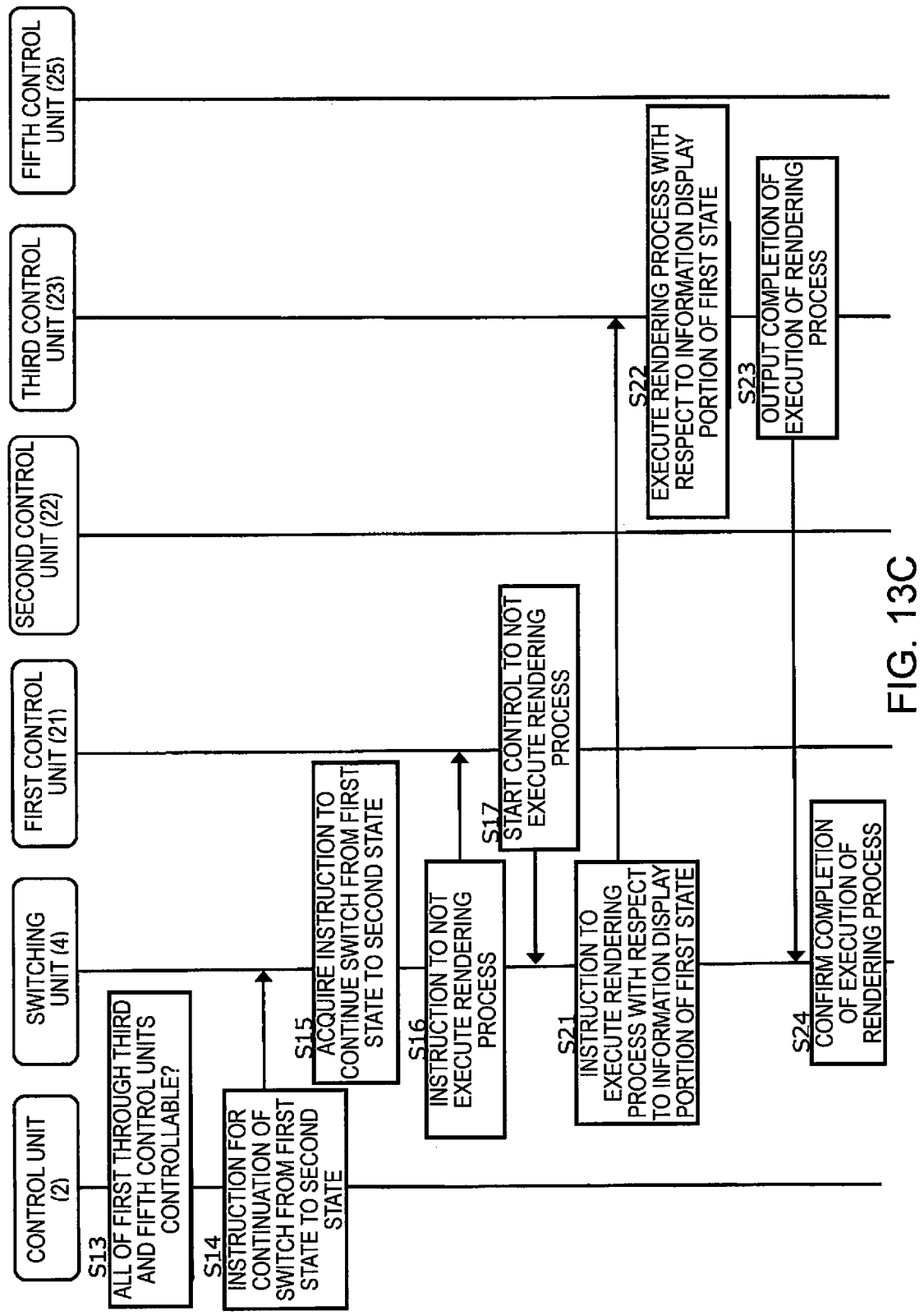
FIG. 13C is a flowchart showing one example of an information processing procedure carried out in the vehicle display device of FIG. 1 (part 3).

Proceeding to FIG. 13C, in Step S13, the control unit 2 confirms whether all of the first control unit 21 through the third control unit 23 and the fifth control unit 25 can appropriately control the display of information on the layers based on the acquired outputs, by means of the master device function. If the first control unit 21 through the third control unit 23 and the fifth control unit 25 includes a control unit that cannot appropriately control the display of information on a layer, the process returns to Steps S10a-S10d, and the control states are re-confirmed. Alternatively, the execution of the routine may be stopped and the processing by the control device 14 ended. On the other hand, if all of the first control unit 21 through the third control unit 23 and the fifth control unit 25 can appropriately control the display of information on a layer, the process proceeds to Step S14, and the control unit 2 instructs the switching unit 4 to continue the display switching process.

In Step S15, the switching unit 4 acquires the instruction to continue switching from the first state through the second state from the control unit 2. In the next Step S16, the switching unit 4 instructs the first control unit 21 not to execute an effecting process with respect to the display portion for the information displayed on the first layer L1, by means of the function for switching between the first state and the second state. In Step S17, the first control unit 21 starts a control not to execute an effecting process with respect to the display of the information on the first layer L1, by means of the function for controlling the display of information on the first layer L1. After said control is started, the process proceeds to Step S121.

In Step S121, the switching unit 4 instructs the third control unit 23 to execute an effecting process with respect to the display portion for the information displayed in the first state, by means of the function for switching between the first state and the second state. In Step S22, the third control unit 23, which has acquired the instruction to execute the effecting process, executes the effecting process with respect to the display portion for the information displayed in the first state, by means of the function for controlling the display of information on the third layer L3.

Figure 16A:
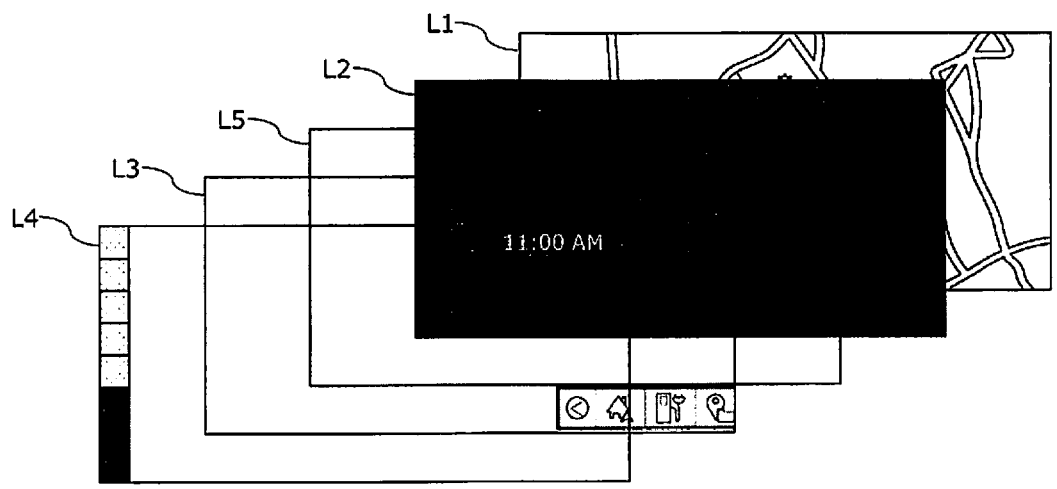
FIG. 16A is one example of information displayed on each layer in Step S22 of FIG. 13C.
Figure 16B:
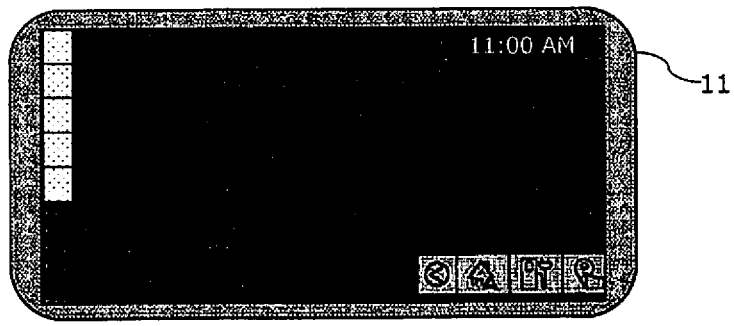
FIG. 16B is one example of information displayed on the display unit in Step S22 of FIG. 13C.

In Step S22, for example, the information shown in FIG. 16A is displayed on each layer. That is, an image of buttons for touch operation is displayed on the left side, and a clock is displayed on the upper right side of the fourth layer L4. In the third layer L3, an effecting process in which the image disappears to the lower right of the third layer L3 is executed with respect to the image with icons for changing the display of the display unit 11. Nothing is displayed on the fifth layer L5, and an opaque dummy background is displayed on the second layer L2. In addition, map information is displayed on the first layer LL. In this case, the display information generated by the superposing unit 3 is the information shown in FIG. 16B. That is, on the display unit 11, information of the third layer L3, which is subjected to the effecting process, and information displayed on the fourth layer L4 are displayed over the dummy background.

Returning to FIG. 13C, in Step S23, the third control unit 23 outputs to the switching unit 4 the fact that execution of the effecting process has been completed by means of the function for controlling the display of information on the third layer L3. In Step S24, the switching unit 4 acquires the output of the third control unit 23 and confirms that the execution of the effecting process has been completed. Note that Step S24 is not an indispensable step and may be provided as needed.

Figure 13D:
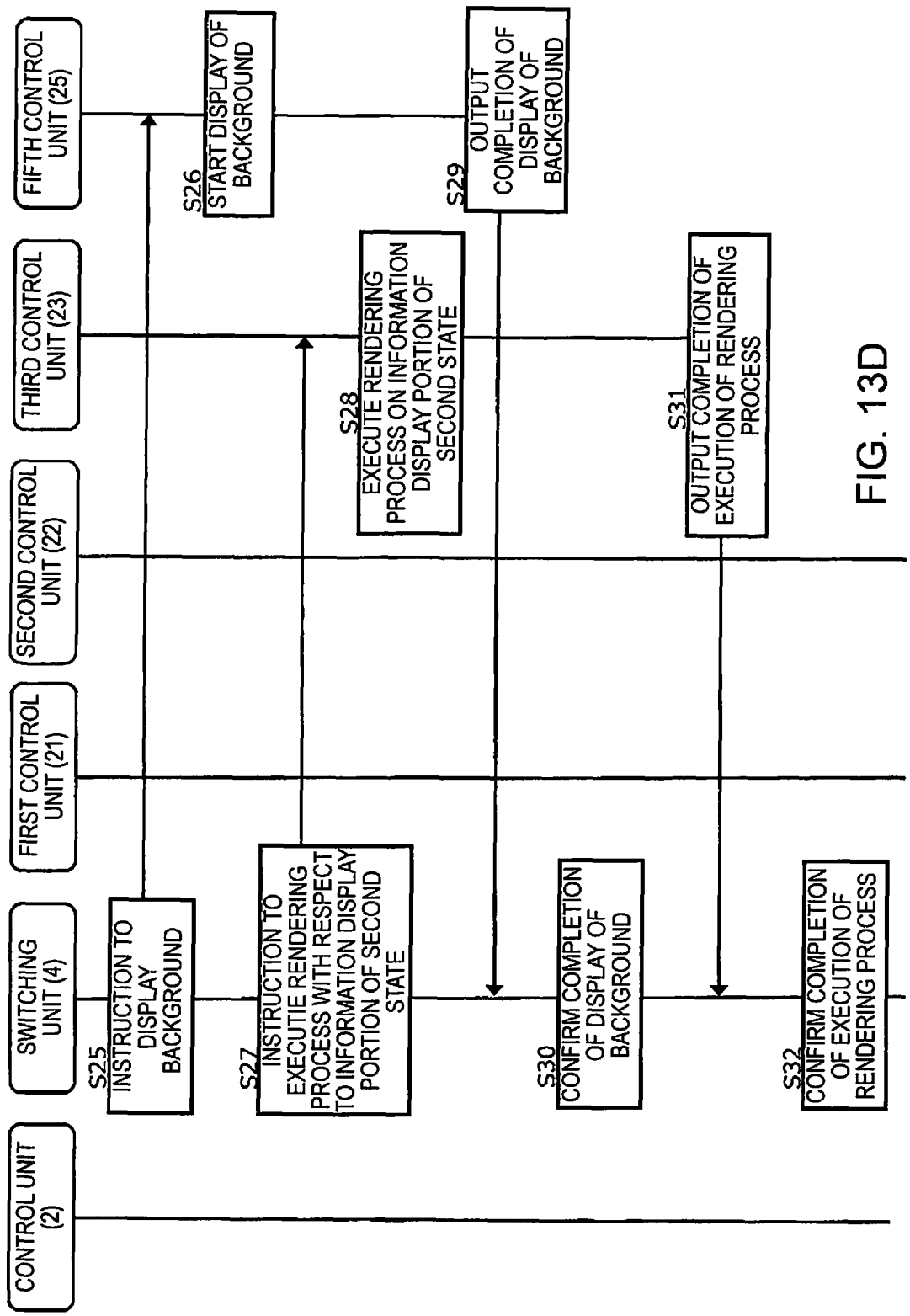
FIG. 13D is a flowchart showing one example of an information processing procedure carried out in the vehicle display device of FIG. 1 (part 4).

Proceeding to FIG. 13D, in Step S25, the switching unit 4 instructs the fifth control unit 25 to display the background by means of the function for switching between the first state and the second state. In Step S26, the fifth control unit 25, which has acquired the instruction to display the background, starts the display of the background by means of the function for controlling the display of information on the fifth layer L5. In addition, in Step S27, the switching unit 4 instructs the third control unit 23 to execute an effecting process with respect to the display portion for the information to be displayed in the second state, by means of the function for switching between the first state and the second state. In Step S28, the third control unit 23, which has acquired the instruction to execute the effecting process, executes the effecting process with respect to the display portion for the information to be displayed in the second state, by means of the function for controlling the display of information on the third layer L3.

Figure 17A:
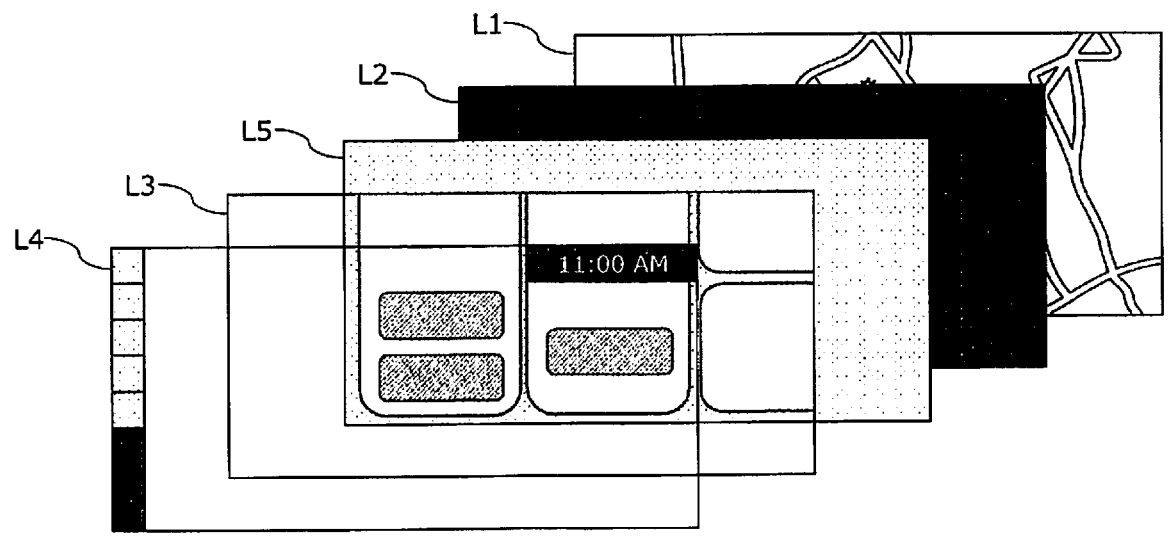
FIG. 17A is one example of information displayed on each layer in Step S28 of FIG. 13D.
Figure 17B:
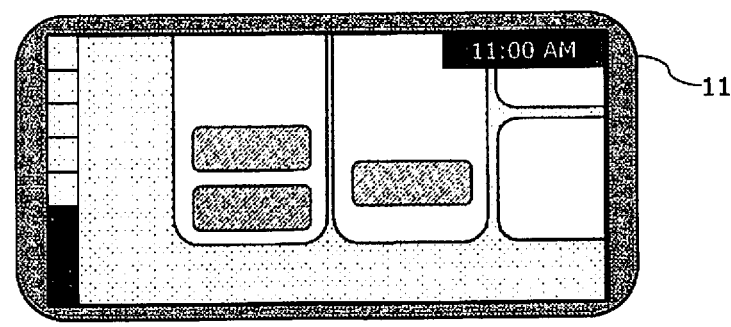
FIG. 17B is one example of information displayed on the display unit in Step S28 of FIG. 13D.

In Step S28, for example, the information shown in FIG. 17A is displayed on each layer. That is, an image of buttons for touch operation is displayed on the left side, and a clock is displayed on the upper right side of the fourth layer L4. In the third layer L3, an effecting process in which an image appears from the upper right of the third layer L3 is executed with respect to the display portion for the information to be displayed in the second state. The fifth layer L5 displays a background on which an effecting process in which the transmittance gradually decreases is executed. An opaque dummy background is displayed on the second layer L2. In addition, map information is displayed on the first layer L1. In this case, the display information generated by the superposing unit 3 is the information shown in FIG. 17B. That is, on the display unit 11, information of the third layer L3, which is subjected to an effecting process, and information displayed on the fourth layer L4 are displayed over the background displayed on the fifth layer L5, the transmittance of which is changed.

Returning to FIG. 13D, in Step S29, the fifth control unit 25 outputs information to the switching unit 4 that execution of the effecting process with respect to the background has been completed and that the background has been displayed by means of the function for controlling the display of information on the fifth layer L5. In Step S30, the switching unit 4 acquires the output of the fifth control unit 25 and confirms that the execution of the effecting process with respect to the background has been completed. In addition, in Step S31, the third control unit 23 outputs, to the switching unit 4, the fact that execution of the effecting process with respect to the display portion for the information to be displayed in the second state has been completed by means of the function for controlling the display of information on the third layer L3. In Step S32, the switching unit 4 acquires the output of the third control unit 23 and confirms that the execution of the effecting process with respect to the display portion for the information on the third layer L3 has been completed.

Figure 18A:
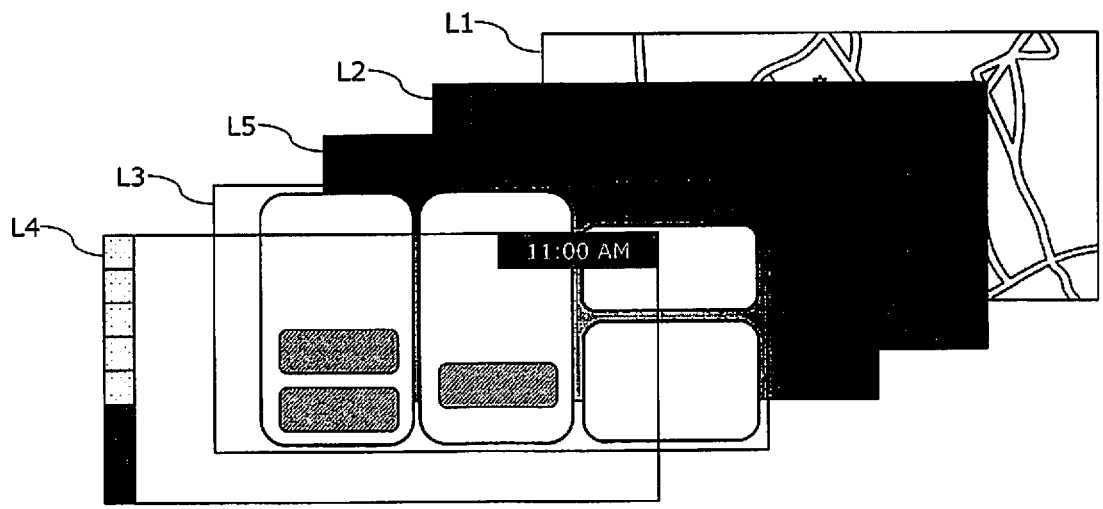
FIG. 18A is one example of information displayed on each layer in Step S32 of FIG. 13D.

In Step S32, for example, information shown in FIG. 18A is displayed on each layer. That is, an image of buttons for touch operation is displayed on the left side, and a clock is displayed on the upper right side of the fourth layer L4. The third layer L3 displays information displayed in the second state. The fifth layer L5 displays a background on which the brightness of some parts is set higher than the brightness of the other parts. An opaque dummy background is displayed on the second layer L2. In addition, map information is displayed on the first layer L1. In this case, the display information generated by the superposing unit 3 is the information shown in FIG. 18B. That is, on the display unit 11, the information displayed on the third layer L3 and the information displayed on the fourth layer L4 are displayed over the background displayed on the fifth layer L5. The dummy background displayed on the second layer L2 and the map information displayed on the first layer L1 cannot be seen by the user.

Return to FIG. 13D. Note that Steps S30 and S32 are not indispensable steps and may be provided as needed. In addition, Steps S25 and S27 may be executed at the same timing (for example, simultaneously).

Figure 13E:
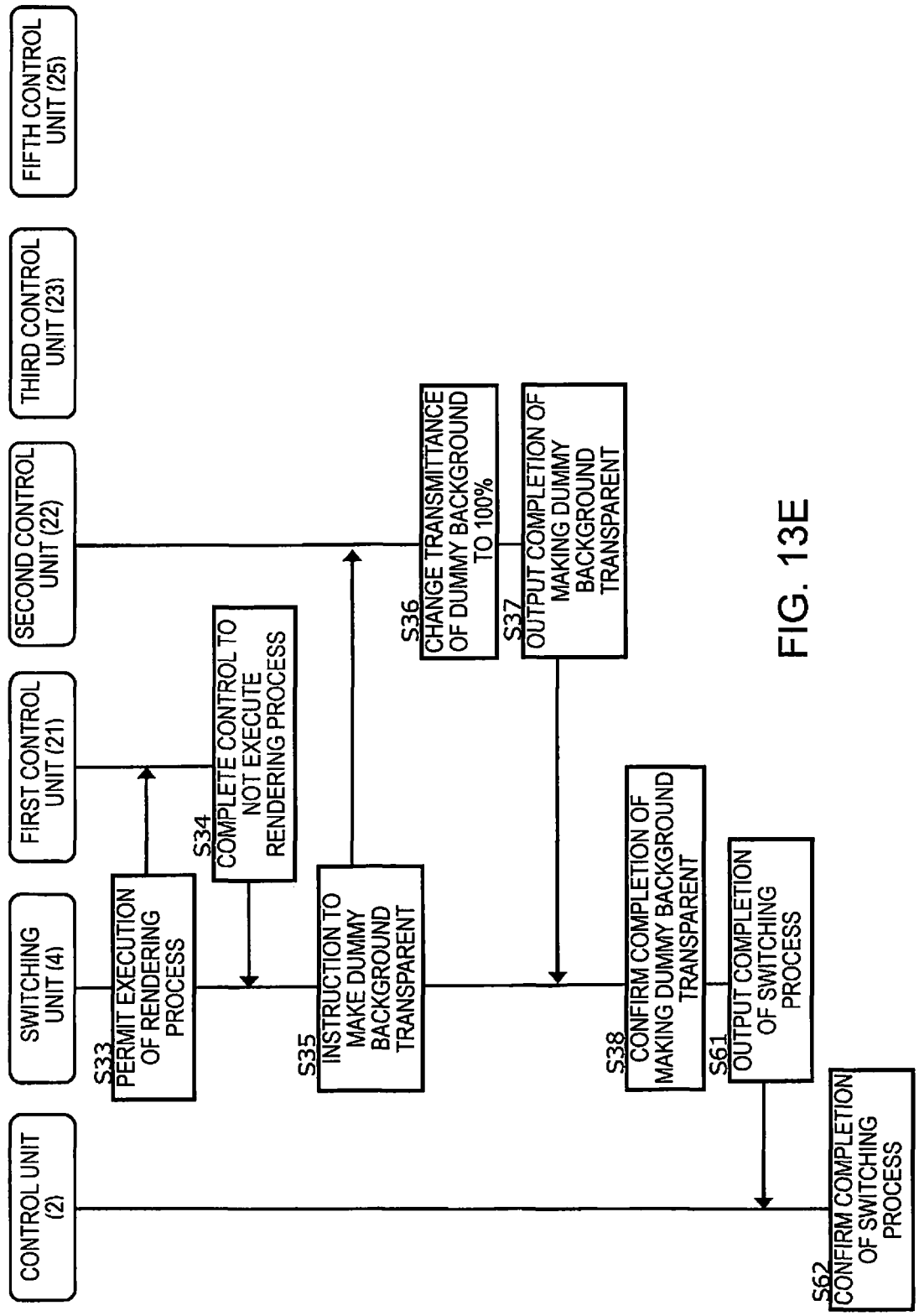
FIG. 13E is a flowchart showing one example of an information processing procedure carried out in the vehicle display device of FIG. 1 (part 5).

Proceeding to FIG. 13E, in Step S33, the switching unit 4 permits the first control unit 21 to execute an effecting process with respect to the display portion for the information displayed on the first layer L1, by means of the function for switching between the first state and the second state. In Step S34, the first control unit 21 completes the control not to execute an effecting process with respect to the display of the information on the first layer L1, by means of the function for controlling the display of information on the first layer L1. It is then possible to execute an effecting process with respect to the information displayed on the first layer L1, such as changing the mode of display. The process then proceeds to Step S35. In the case shown in FIGS. 13A-13E, at the stage of Step S32, since the display state is such that the user cannot see the map information, i.e., the second state, even if the display switching process is not completed, the execution of the effecting process by the first control unit 21 can be permitted.

In Step S35, the switching unit 4 outputs an instruction to the second control unit 22 to make the dummy background of the second layer L2 transparent, by means of the function for switching between the first state and the second state. In Step S36, the second control unit 22 changes the transmittance of the dummy background of the second layer L2, for example, from 0% (opaque state) to 100% (transparent state) by means of the function for controlling the display of information on the second layer L2.

Figure 18B:
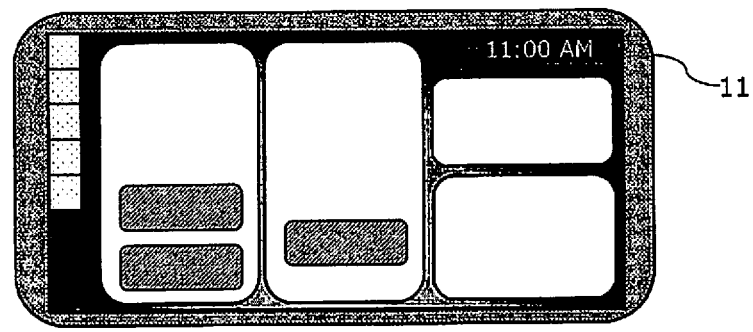
FIG. 18B is one example of information displayed on the display unit in Step S32 of FIG. 13D.
Figure 19A:
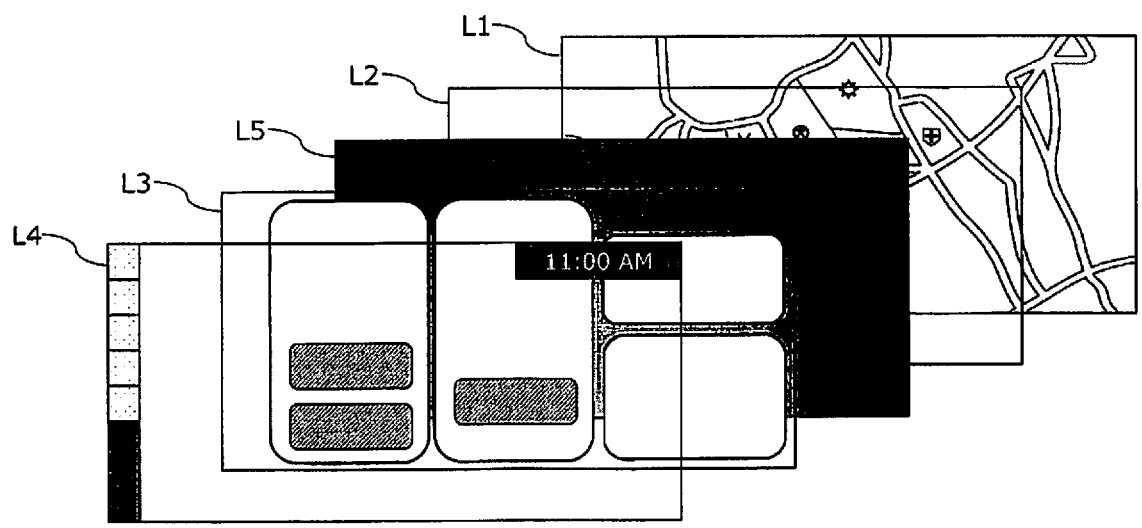
FIG. 19A is one example of information displayed on each layer in Step S37 of FIG. 13E.
Figure 19B:
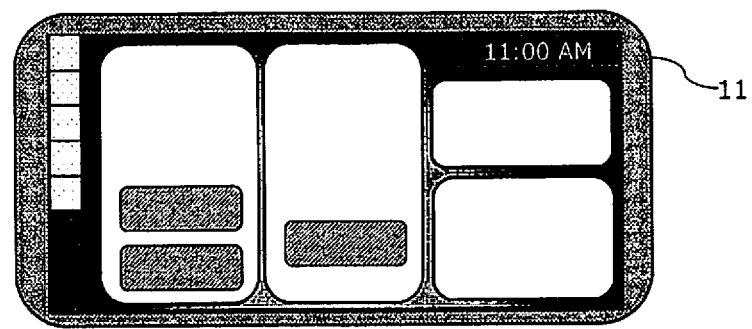
FIG. 19B is one example of information displayed on the display unit in Step S37 of FIG. 13E.

In Step S36, for example, the information shown in FIG. 19A is displayed on each layer. That is, an image of buttons for touch operation is displayed on the left side, and a clock is displayed on the upper right side of the fourth layer L4. The third layer L3 displays information displayed in the second state, and the fifth layer L5 displays a background in which the brightness of some part is set higher than the brightness of the other parts. The second layer L2 displays a transparent dummy background (that is, the same state as not displaying anything), and the first layer L1 displays map information. In this case, the display information generated by the superposing unit 3 is the information shown in FIG. 19B. That is, the same display image as that in FIG. 18B is displayed on the display unit 11.

Returning to FIG. 13E, in Step S37, the second control unit 22 outputs, to the switching unit 4, the fact that the dummy background has been made transparent by means of the function for controlling the display of information on the second layer L2. In Step S38, the switching unit 4 acquires the output of the second control unit 22 and confirms that the dummy background has become transparent. In the next Step S61, the switching unit 4 outputs, to the control unit 2, the fact that the display switching process is completed, by means of the function for switching between the first state and the second state. Then, in Step S62, the control unit 2 acquires the output of the switching unit 4 and confirms that the display switching process has been completed. The processing performed by the control device 14 is then ended. Note that Step S38 is not an indispensable step and may be provided as needed.

The procedure used when the control device 14 processes information will be described with reference to FIGS. 20A-20E. FIGS. 20A-20E are other examples of flowcharts showing the information processing in the vehicle display device 1 of the present embodiment. The processes described below are executed when the processor 15 of the control device 14 switches the display from the second state to the first state. In the flowcharts shown in FIGS. 20A-20E, the steps to carry out the same processes as those in the flowcharts shown in FIGS. 13A-13E have the same numbering as the steps in the flowcharts shown in FIGS. 13A-13E.

In addition, in the following description, it is assumed that in the second state before the routines shown in FIGS. 20A-20E are executed, each layer displays the information shown in FIG. 21A. That is, an image of buttons for touch operation is displayed on the left side, and a clock is displayed on the upper right side of the fourth layer L4. The third layer L3 displays information displayed in the second state, and the fifth layer L5 displays a background on which the brightness of some parts is set higher than the brightness of the other parts. The second layer L2 displays a transparent dummy background (that is, nothing is displayed), and the first layer L1 displays map information. In this case, the display information generated by the superposing unit 3 is the information shown in FIG. 21B. That is, on the display unit 11, the information displayed on the third layer L3 and the information displayed on the fourth layer L4 are displayed over the background displayed on the fifth layer L5. The map information displayed on the first layer L1 is in the shadow of the background displayed on the fifth layer L5 and thus cannot be seen by the user.

Figure 20A:
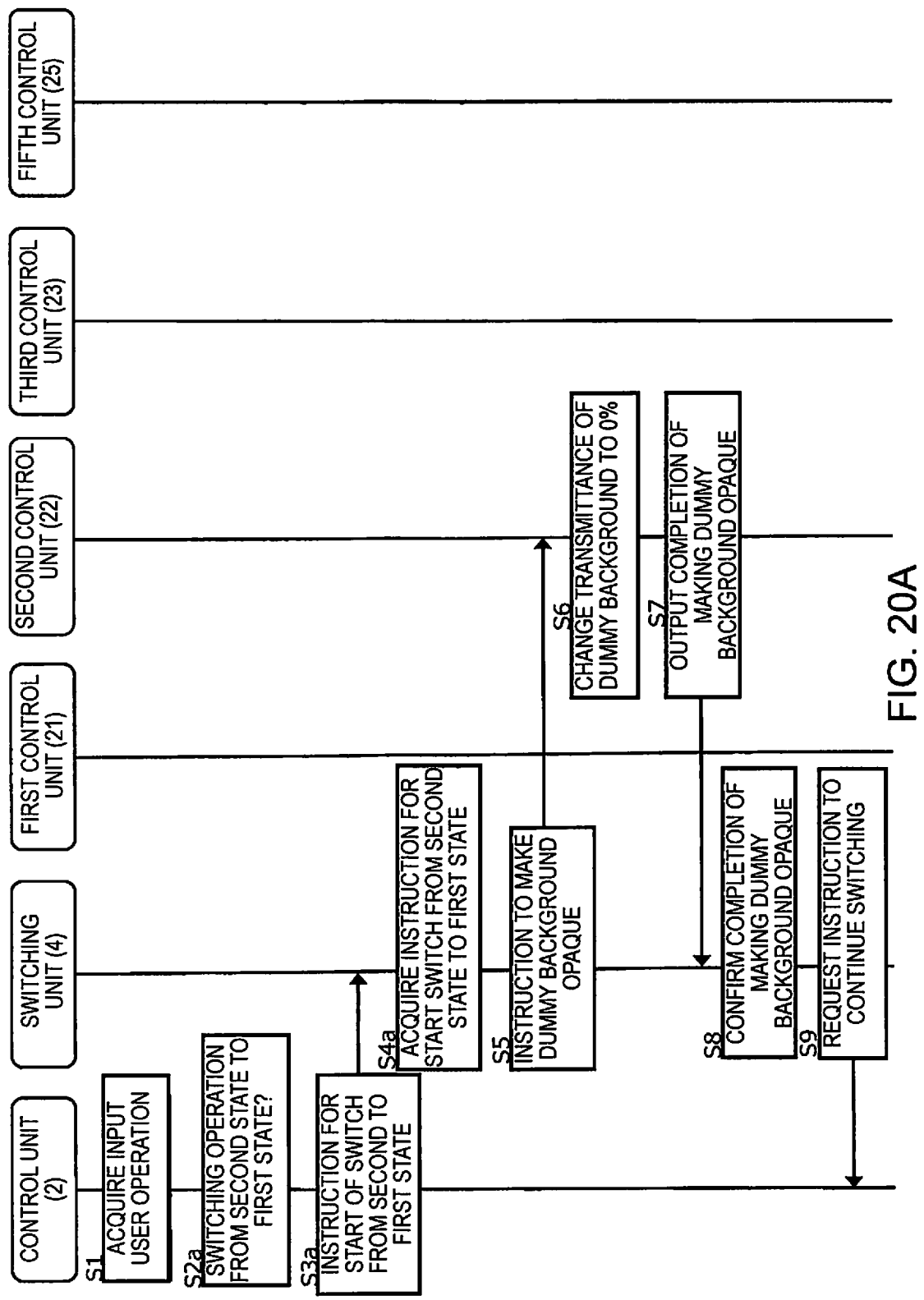
FIG. 20A is a flowchart showing another example of an information processing procedure carried out in the vehicle display device of FIG. 1 (part 1).
Figure 21A:
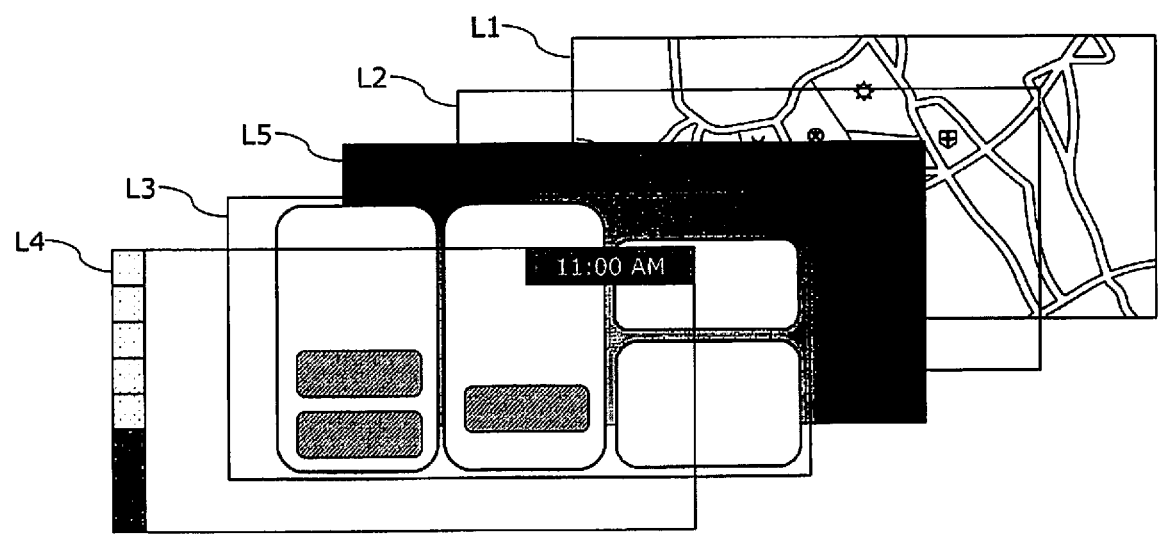
FIG. 21A is one example of information displayed on each layer in Step S1 of FIG. 20A.
Figure 21B:
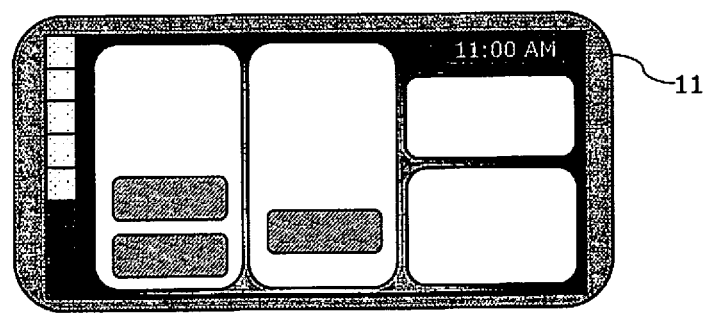
FIG. 21B is one example of information displayed on the display unit in Step S1 of FIG. 20A.

First, in Step S1 of FIG. 20A, by means of the function of the control unit 2, the user operation input from the touch operation unit 12 and/or the input unit 13 is acquired, and in the next Step S2a, it is determined whether the acquired operation is an operation to switch the second state to the first state. If the acquired operation is not an operation to switch the second state to the first state, the execution of the routine is stopped and the processing by the control device 14 is ended. On the other hand, if the acquired operation is an operation to switch the second state to the first state, the process proceeds to Step S3a, and by means of the master device function of the control unit 2, the switching unit 4 is instructed to start switching from the second state to the first state.

In Step S4a, the switching unit 4 acquires the instruction to start switching from the second state to the first state. In the next Step S5, the switching unit 4 outputs an instruction to the second control unit 22 to make the dummy background of the second layer L2 opaque to the second control unit 22, by means of the function for switching between the first state and the second state. In Step S6, the second control unit 22 changes the transmittance of the dummy background of the second layer L2, for example, from 100% (transparent state) to 0% (opaque state), by means of the function for controlling the display of information on the second layer L2.

Figure 22A:
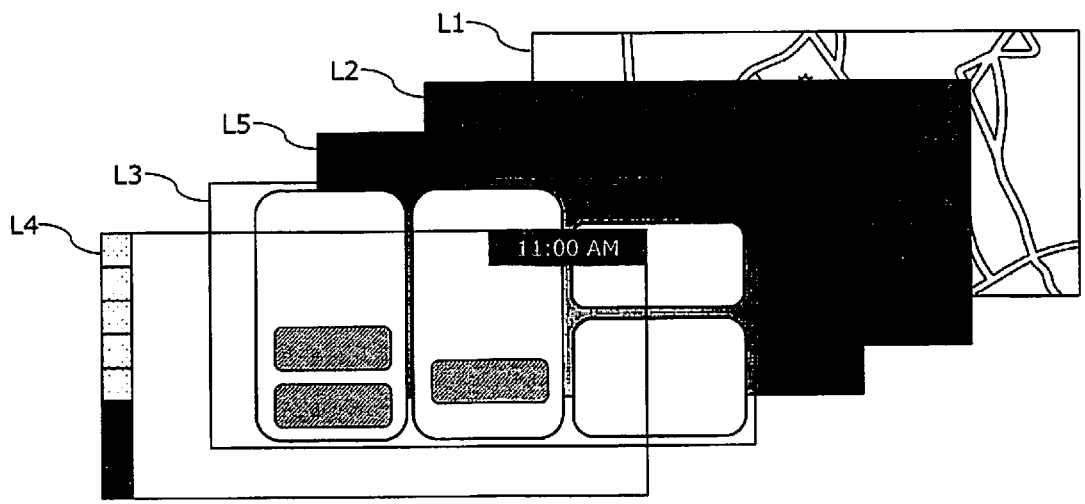
FIG. 22A is one example of information displayed on each layer in Step S6 of FIG. 20A.
Figure 22B:
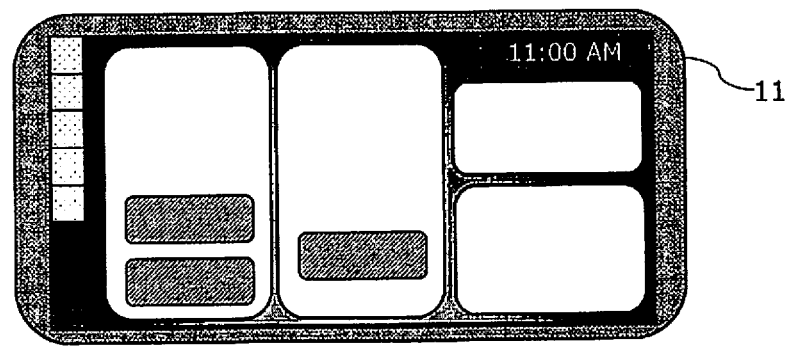
FIG. 22B is one example of information displayed on the display unit in Step S6 of FIG. 20A.

In Step S6, for example, information shown in FIG. 22A is displayed on each layer. That is, an image of buttons for touch operation is displayed on the left side, and a clock is displayed on the upper right side of the fourth layer L4. The third layer L3 displays information displayed in the second state, and the fifth layer L5 displays a background on which the brightness of some parts is set higher than the brightness of the other parts. An opaque dummy background is displayed on the second layer L2. In addition, map information is displayed on the first layer L1. In this case, the display information generated by the superposing unit 3 is the information shown in FIG. 22B. That is, the display information displayed on the display unit 11 is the same as that shown in FIG. 21B.

Returning to FIG. 20A, the processes of the next Steps S7-S9 are executed. Since these steps are the same as the above-described steps of Steps S7-S9 of FIG. 13A, their descriptions will be omitted here.

Figure 20B:
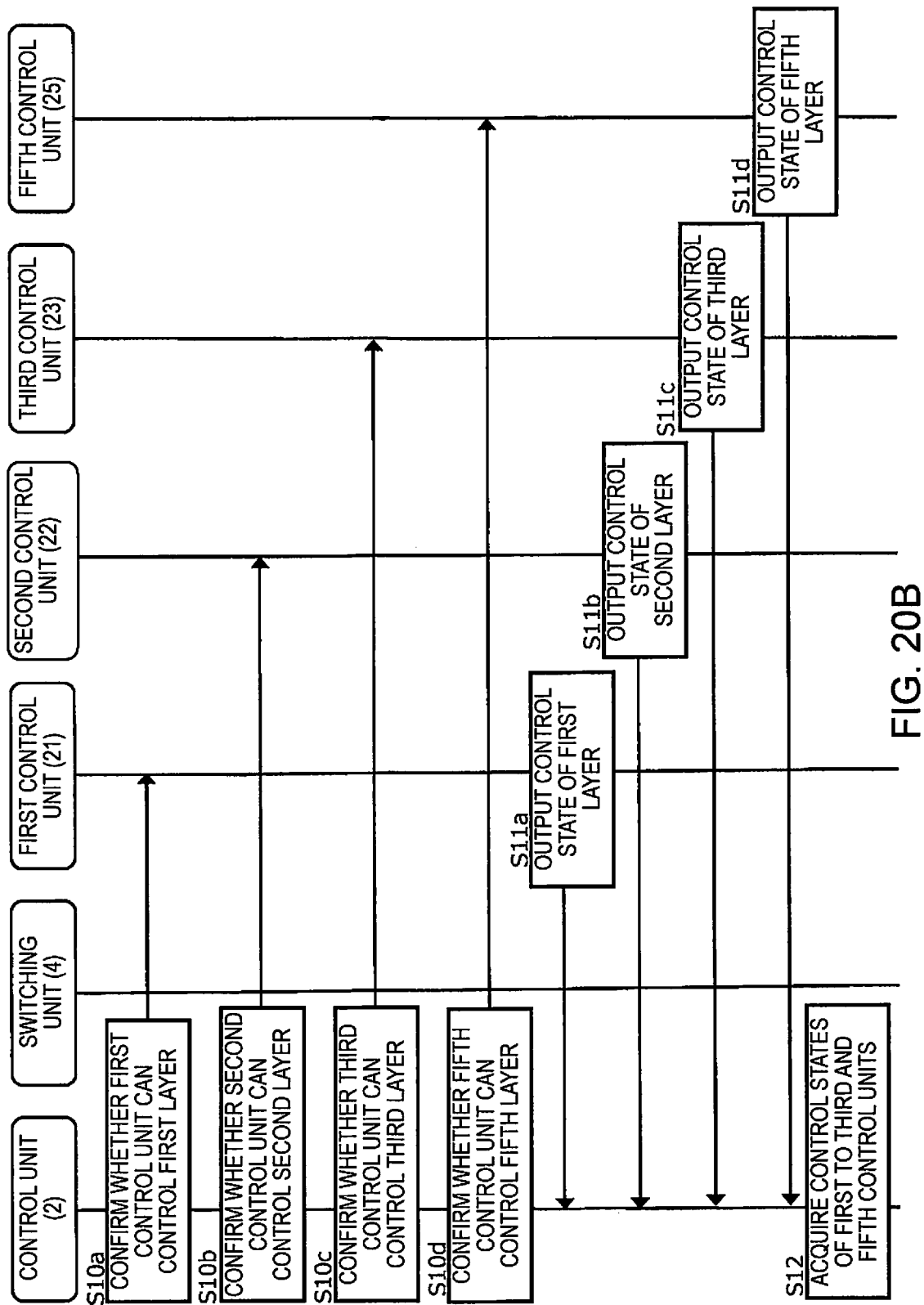
FIG. 20B is a flowchart showing another example of an information processing procedure carried out in the vehicle display device of FIG. 1 (part 2).

Proceeding to FIG. 20B, Steps S10a-S10d, Steps S11a-S11d, and Step S12 are executed. Since these steps are the same as the above-described steps shown in FIG. 13B, their descriptions will be omitted here.

Figure 20C:
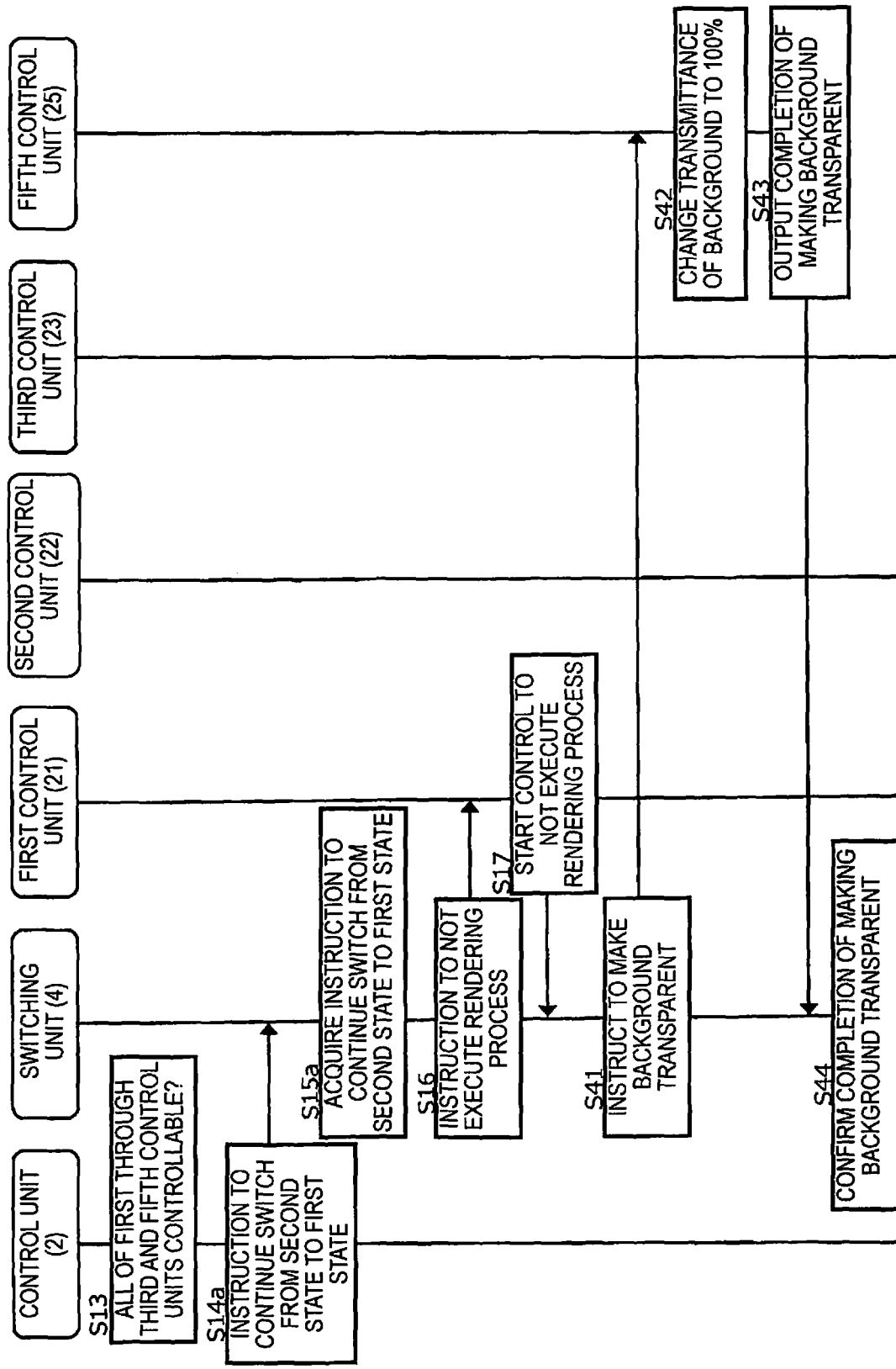
FIG. 20C is a flowchart showing another example of an information processing procedure carried out in the vehicle display device of FIG. 1 (part 3).

Proceeding to FIG. 20C, the control unit 2 confirms whether all of the first control unit 21 through the third control unit 23 and the fifth control unit 25 can appropriately control the display of information on the layers based on the acquired output, by means of the master device function. If the first control unit 21 through the third control unit 23 and the fifth control unit 25 includes a control unit that cannot appropriately control the display of information on a layer, the process returns to Steps S10a-S10d, and the control states are re-confirmed. Alternatively, the execution of the routine may be stopped and the processing by the control device 14 may be ended. On the other hand, if all of the first control unit 21 through the third control unit 23 and the fifth control unit 25 can appropriately control the display of information on a layer, the process proceeds to Step S14a, and the control unit 2 instructs the switching unit 4 to continue the display switching process.

In Step S15a, the switching unit 4 acquires an instruction from the control unit 2 to continue switching from the second state to the first state. Since the next Steps S16 and S17 are the same as the Steps S16 and S17 of FIG. 13C, their descriptions will be omitted here. Then, after starting the control not to execute an effecting process with respect to the information display portion in the first layer L1, the process proceeds to Step S41 in the flowchart shown in FIG. 20C.

In Step S41, the switching unit 4 instructs the fifth control unit 25 to make the background transparent, by means of the function for switching between the first state and the second state. The fifth control unit 25, which has acquired the instruction to make the background transparent, increases the transmittance of the background by means of the function for controlling the display of information on the fifth layer L5, in Step S42.

Figure 23A:
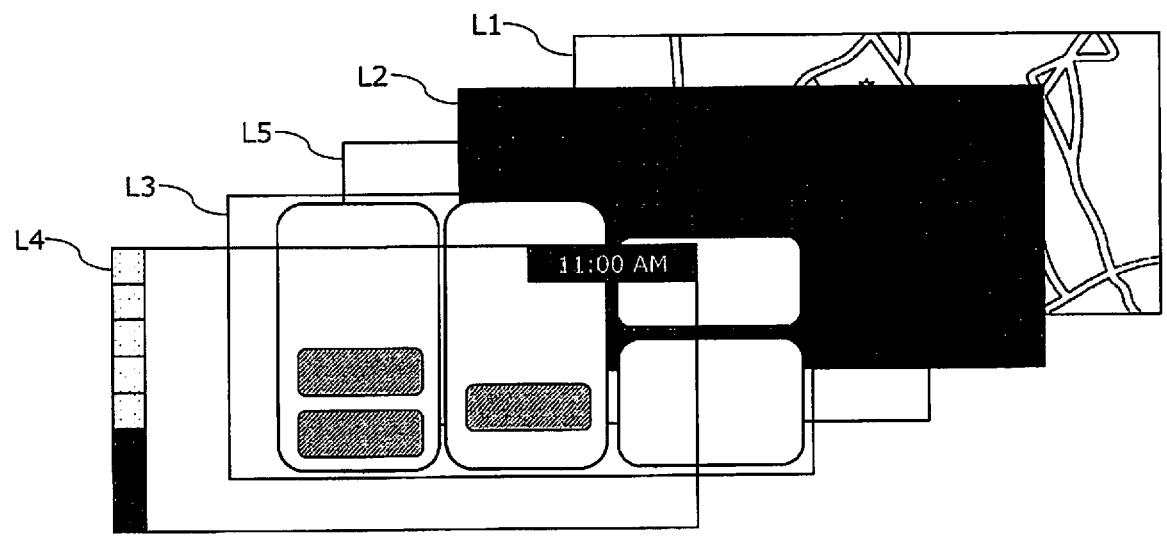
FIG. 23A is one example of information displayed on each layer in Step S42 of FIG. 20C.
Figure 23B:
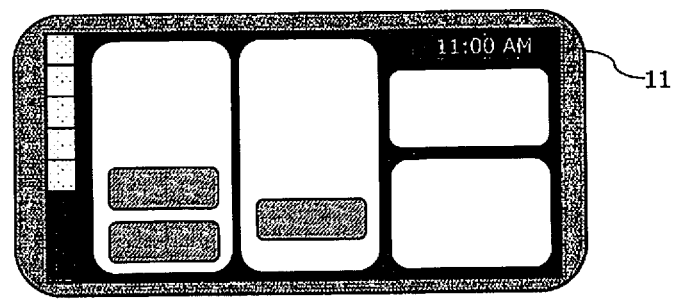
FIG. 23B is one example of information displayed on the display unit in Step S42 of FIG. 20C.

In Step S42, for example, information shown in FIG. 23A is displayed on each layer. That is, an image of buttons for touch operation is displayed on the left side, and a clock is displayed on the upper right side of the fourth layer L4. The third layer L3 displays information displayed in the second state. The fifth layer L5 displays a transparent (transmittance of 100%, for example) background, which is the same state as nothing being displayed. An opaque dummy background is displayed on the second layer L2. In addition, map information is displayed on the first layer L1. In this case, the display information generated by the superposing unit 3 is the information shown in FIG. 23B. That is, on the display unit 11, the information displayed on the third layer L3 and the information displayed on the fourth layer L4 are displayed over the dummy background displayed on the second layer L2.

Returning to FIG. 20C, in Step S43, the fifth control unit 25 outputs, to the switching unit 4, the fact that the background has been made transparent by means of the function for controlling the display of information on the fifth layer L5. In Step S44, the switching unit 4 acquires the output of the fifth control unit 25 and confirms that the background has become transparent. Note that Step S44 is not an indispensable step and may be provided as needed.

Figure 20D:
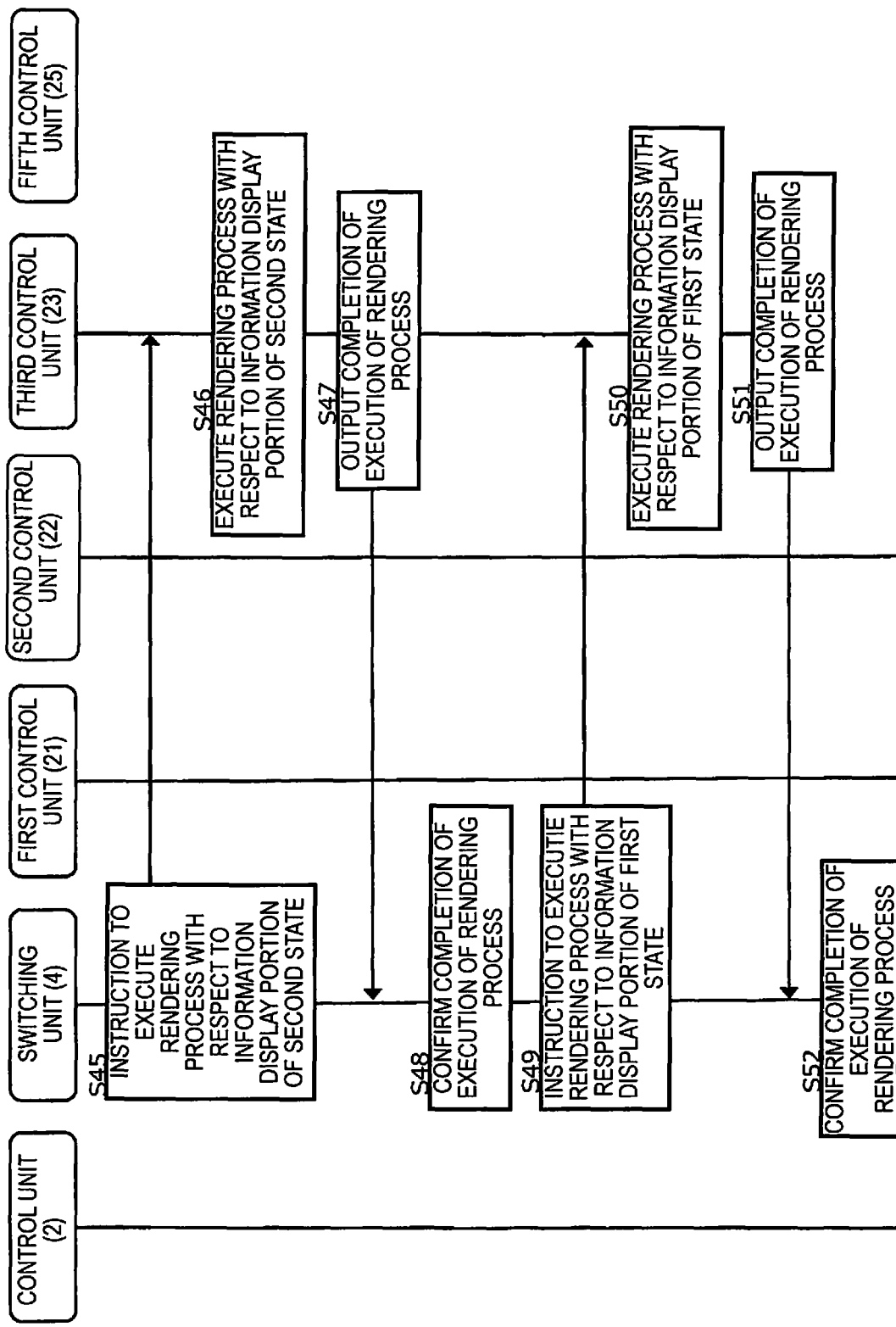
FIG. 20D is a flowchart showing another example of an information processing procedure carried out in the vehicle display device of FIG. 1 (part 4).
Figure 20E:
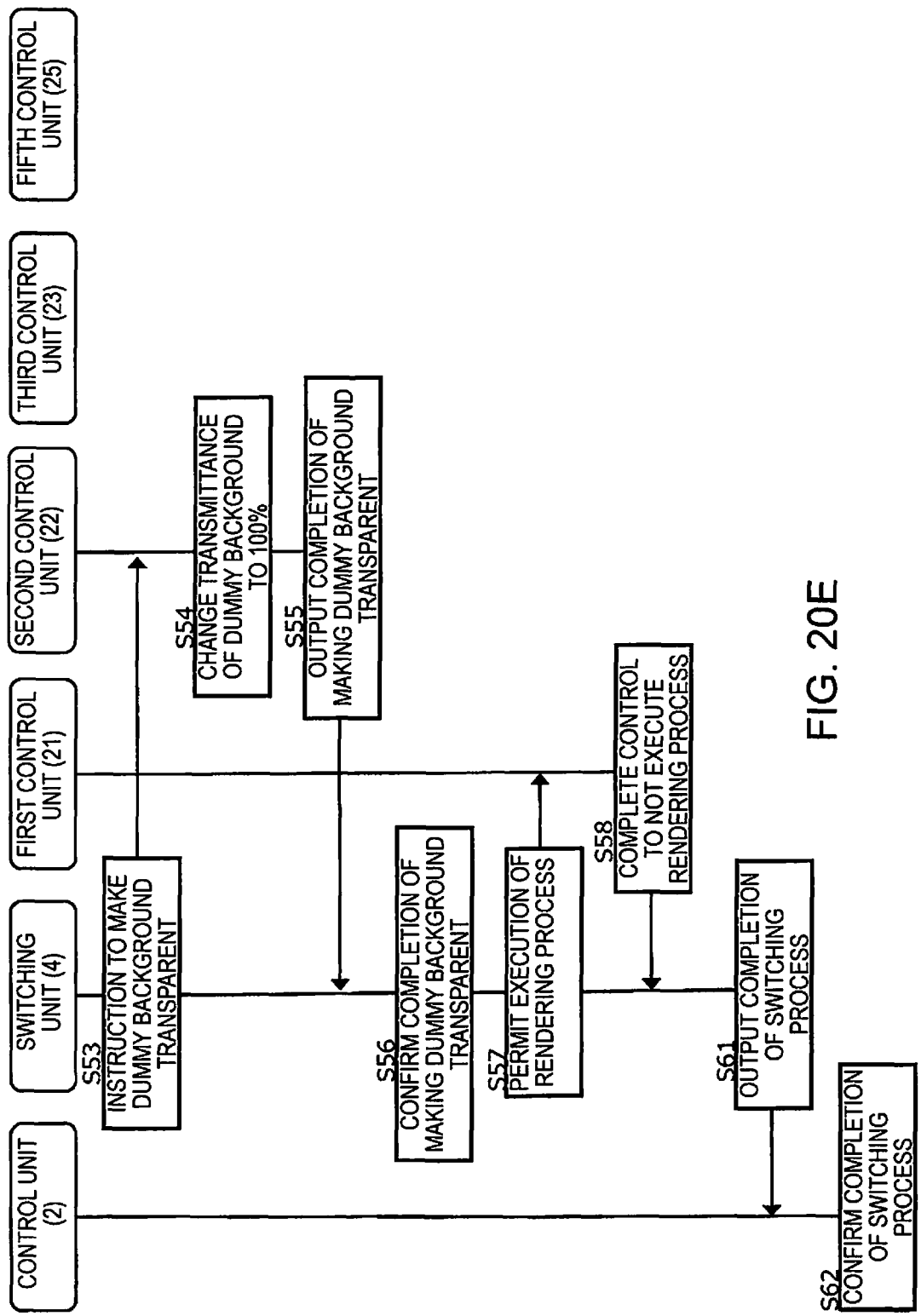
FIG. 20E is a flowchart showing another example of an information processing procedure carried out in the vehicle display device of FIG. 1 (part 5).

Proceeding to FIG. 20D, in Step S45, the switching unit 4 instructs the third control unit 23 to execute an effecting process with respect to the display portion for the information displayed in the second state, by means of the function for switching between the first state and the second state. The third control unit 23, which has acquired the instruction to execute the effecting process, executes the effecting process with respect to the display portion for the information displayed in the second state, by means of the function for controlling the display of information on the third layer L3, in Step S46.

Figure 24A:
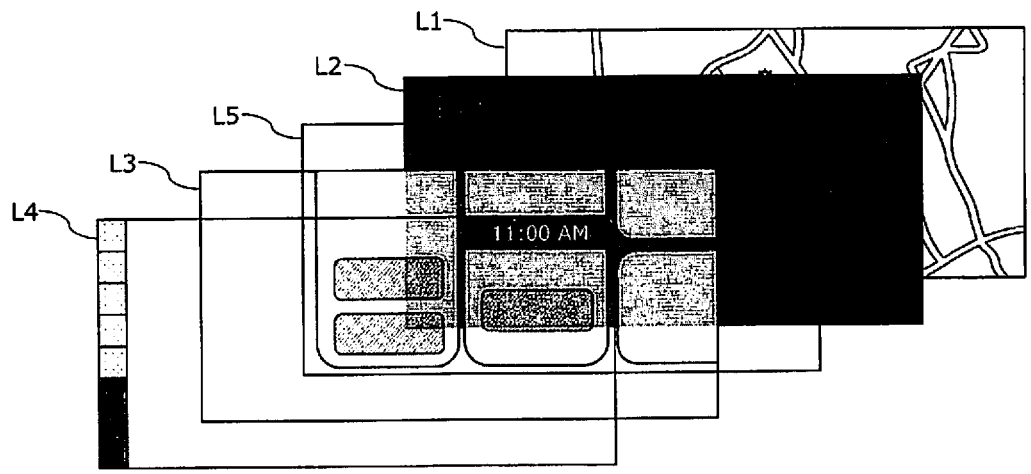
FIG. 24A is one example of information displayed on each layer in Step S46 of FIG. 20D.
Figure 24B:
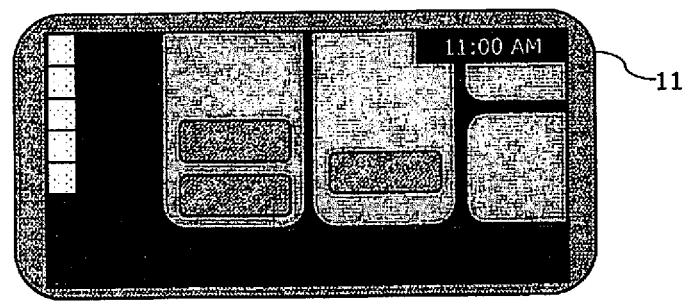
FIG. 24B is one example of information displayed on the display unit in Step S46 of FIG. 20D.

In Step S46, for example, information shown in FIG. 24A is displayed on each layer. That is, an image of buttons for touch operation is displayed on the left side, and a clock is displayed on the upper right side of the fourth layer L4. In the third layer L3, an effecting process in which an image fades out to the upper right of the third layer L3 is executed on the display portion for the information displayed in the second state. The fifth layer L5 displays either nothing or a background with a transmittance of 100%. An opaque dummy background is displayed on the second layer L2. In addition, map information is displayed on the first layer L1. In this case, the display information generated by the superposing unit 3 is the information shown in FIG. 24B. That is, on the display unit 11, information of the third layer L3, which is subjected to an effecting process, and information displayed on the fourth layer L4 are displayed over the dummy background displayed on the second layer L2.

Returning to FIG. 20D, in Step S47, the third control unit 23 outputs, to the switching unit 4, the fact that execution of the effecting process with respect to the display portion for the information displayed in the second state has been completed, that is, that the display portion for the information displayed in the second state is no longer displayed on the display unit 11, by means of the function for controlling the display of information on the third layer L3. In Step S48, the switching unit 4 acquires the output of the third control unit 23 and confirms that the execution of the effecting process with respect to the background has been completed. Note that Step S47 is not an indispensable step and may be provided as needed.

In the next Step S49, the switching unit 4 instructs the third control unit 23 to execute an effecting process with respect to the display portion for the information to be displayed in the first state, by means of the function for switching between the first state and the second state. The third control unit 23, which has acquired the instruction to execute the effecting process, executes the effecting process with respect to the display portion for the information to be displayed in the first state, by means of the function for controlling the display of information on the third layer L3, in Step S50.

Figure 25A:
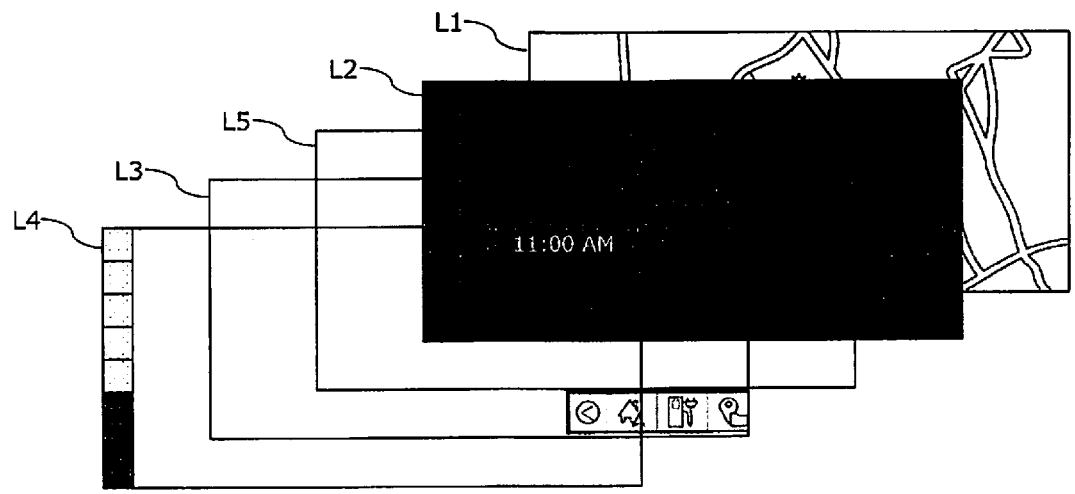
FIG. 25A is one example of information displayed on each layer in Step S50 of FIG. 20D.
Figure 25B:
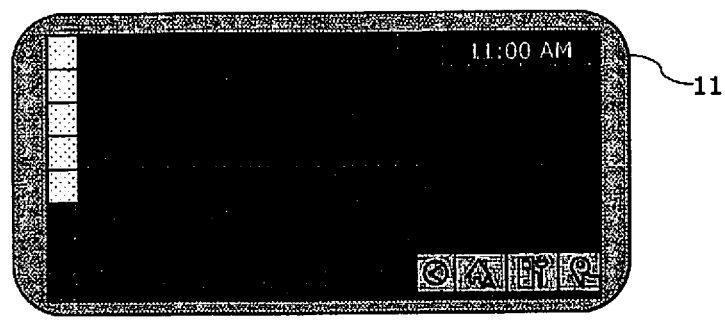
FIG. 25B is one example of information displayed on the display unit in Step S50 of FIG. 20D.

In Step S50, for example, the information shown in FIG. 25A is displayed on each layer. That is, an image of buttons for touch operation is displayed on the left side, and a clock is displayed on the upper right side of the fourth layer L4. In the third layer L3, an effecting process in which the image appears from the lower right of the third layer L3 is executed with respect to the image with icons for changing the display of the display unit 11. Nothing is displayed on the fifth layer L5, and an opaque dummy background is displayed on the second layer L2. In addition, map information is displayed on the first layer L1. In this case, the display information generated by the superposing unit 3 is the information shown in FIG. 25B. That is, on the display unit 11, the information of the third layer L3, which is subjected to the effecting process, and information displayed on the fourth layer L4 are displayed over the dummy background.

Returning to FIG. 20D, in Step S51, the third control unit 23 outputs to the switching unit 4 the fact that execution of the effecting process has been completed by means of the function for controlling the display of information on the third layer L3. In Step S52, the switching unit 4 acquires the output of the third control unit 23 and confirms that the execution of the effecting process has been completed. Note that Step S51 is not an indispensable step and may be provided as needed.

Figure 26A:
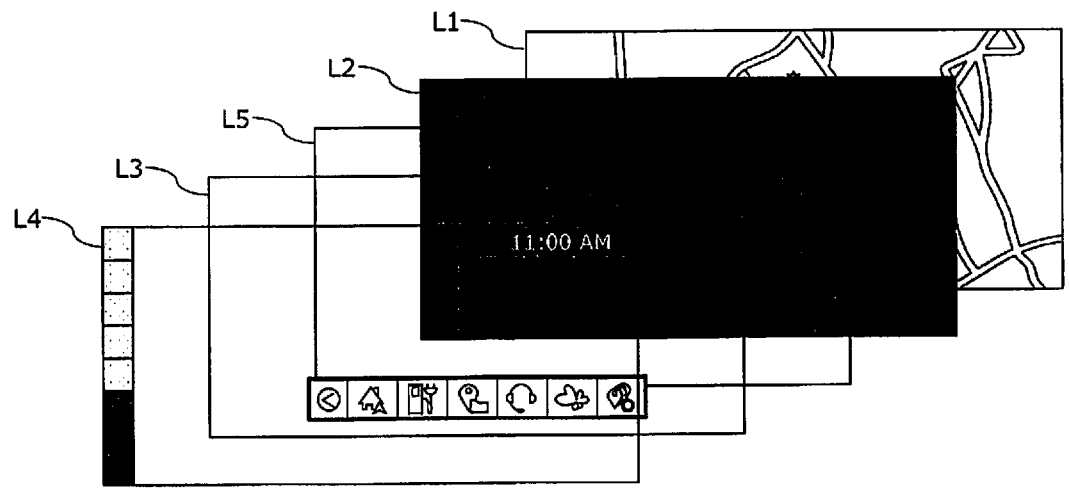
FIG. 26A is one example of information displayed on each layer in Step S52 of FIG. 20D.
Figure 26B:
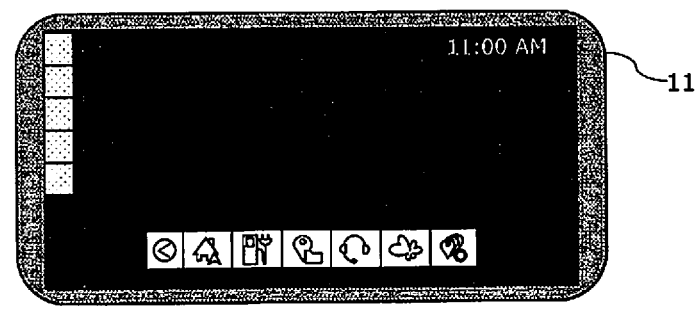
FIG. 26B is one example of information displayed on the display unit in Step S52 of FIG. 20D.

In Step S52, for example, information shown in FIG. 26A is displayed on each layer. That is, an image of buttons for touch operation is displayed on the left side, and a clock is displayed on the upper right side of the fourth layer L4. An image with icons for changing the display of the display unit 11 is displayed on the third layer L3. Nothing is displayed on the fifth layer L5, and an opaque dummy background is displayed on the second layer L2. In addition, map information is displayed on the first layer L1. In this case, the display information generated by the superposing unit 3 is the information shown in FIG. 26B. That is, on the display unit 11, information displayed on the third layer L3 and the fourth layer L4 is displayed over the dummy background.

Returning to FIG. 20E. In Step S53, the switching unit 4 outputs an instruction to the second control unit 22b to make the dummy background of the second layer L2 transparent, by means of the function for switching between the first state and the second state. In Step S54, the second control unit 22 changes the transmittance of the dummy background of the second layer L2 from, for example, 0% (opaque state) to 100% (transparent state) by means of the function for controlling the display of information on the second layer L2.

Figure 27A:
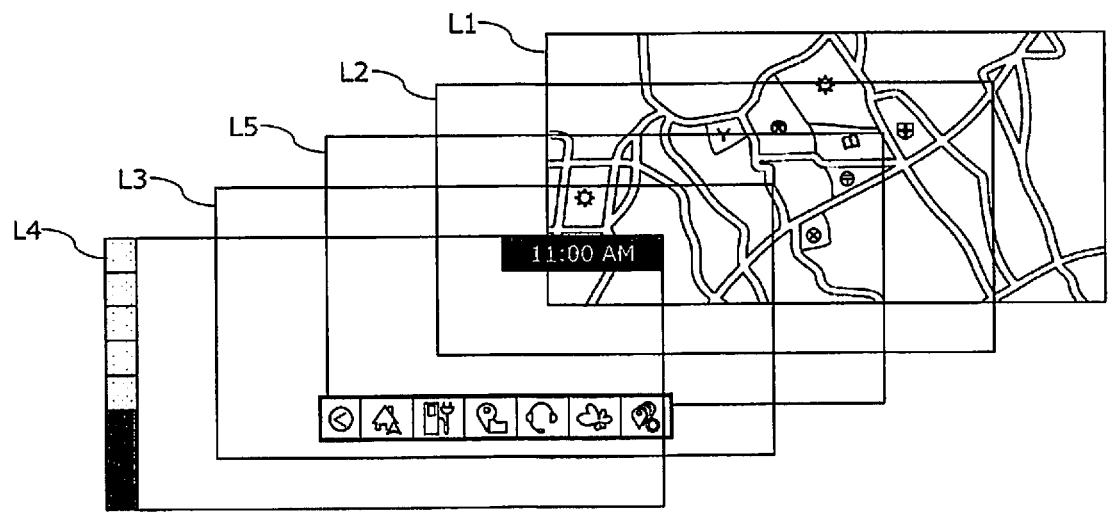
FIG. 27A is one example of information displayed on each layer in Step S54 of FIG. 20E.
Figure 27B:
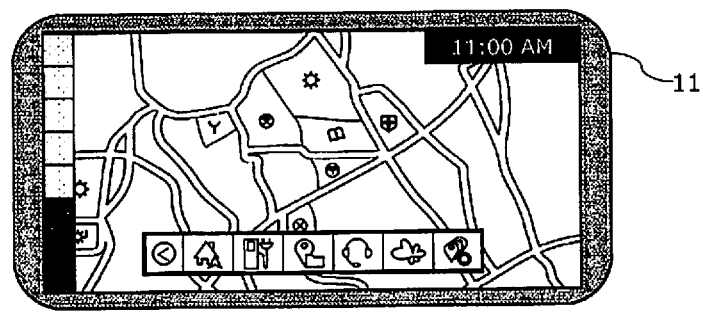
FIG. 27B is one example of information displayed on the display unit in Step S54 of FIG. 20E.

In Step S54, for example, information shown in FIG. 27A is displayed on each layer. That is, an image of buttons for touch operation is displayed on the left side, and a clock is displayed on the upper right side of the fourth layer L4. An image with icons for changing the display of the display unit 11 is displayed on the third layer L3. In addition, nothing is displayed on the fifth layer L5 and the second layer L2, and map information is displayed on the first layer L1. In this case, the display information generated by the superposing unit 3 is the information shown in FIG. 27B. That is, the display state is such that the user can see the map information on the display unit 11, and the information displayed on the third layer L3 and the fourth layer L4 is displayed over the map information. At this stage, the state has switched from the second state to the first state.

Returning to FIG. 20E, in Step S55, the second control unit 22 outputs to the switching unit 4 the fact that the dummy background has been made transparent, by means of the function for controlling the display of information on the second layer L2. In Step S56, the switching unit 4 acquires the output of the second control unit 22 and confirms that the dummy background has become transparent. In the next Step S57, the switching unit 4 permits the first control unit 21 to execute an effecting process with respect to the display portion for the information displayed on the first layer L1, by means of the function for switching between the first state and the second state. In Step S58, the first control unit 21 completes the control not to execute an effecting process with respect to the display of the information on the first layer L1, by means of the function for controlling the display of information on the first layer L1. It is then possible to execute an effecting process with respect to the information displayed on the first layer L1, such as changing the display state. Since the same processes as the above-described steps in FIG. 13E are carried out in the next Steps S61 and S62, their descriptions will be omitted.

EMBODIMENT OF THE PRESENT INVENTION

As described above, the vehicle display device of the present embodiment provides the vehicle display device 1 comprising the first layer L1 that displays map information and/or vehicle periphery information, the second layer L2 that displays a dummy background, the third layer L3 that displays information other than the map information and the image information, the superposing unit 3 that superposes the second layer L2 on the first layer L1, and the third layer L3 on the second layer L2, thereby generating display information, and the switching unit 4 that switches, in accordance with a user operation, between a first state in which the dummy background is transparent and the user can see the information displayed on the first layer L1 in the display information, and a second state in which the dummy background is opaque and the user cannot see the information displayed on the first layer L1 in the display information, wherein, when switching between the first state and the second state, the switching unit 4 does not execute at least one effecting process, from among the switch between the first state and the second state, ending the state before the switch, and starting the state after the switch, with respect to the display portion for the information displayed on the first layer L1, while switching between the first state and the second state, and changes the transmittance of the dummy background to that of the state after the switch, and executes an effecting process that adds the visual effect showing at least one the switch between the first state and the second state, the ending of the state before the switch, and the starting of the state after the switch, with respect to a display portion for the information to be displayed on the third layer L3 in the first state and/or the display portion for the information to be displayed on the third layer L3 in the second state, while switching between the first state and the second state. It is thus possible to suppress an increase in the processing load required for display. In addition, because an increase in the computational load for displaying the map information and the vehicle periphery information is suppressed, it is possible to execute a visual effect that increases user satisfaction, while suppressing the occurrence of screen flicker.

In addition, when switching between the first state and the second state, the switching unit 4 erases, with the passage of time, the display portion for the information displayed in the state before the switch, and causes, with the passage of time, the display portion for the information to be displayed in the state after the switch to appear. It is thus possible to execute a visual effect that further increases user satisfaction.

In addition, by means of the vehicle display device of the present embodiment, the switching unit 4 executes an effecting process including at least one from among moving, shrinking, enlarging, and changing the transmittance of the display portion for the information displayed on the third layer L3. It is thus possible to execute a visual effect that further increases user satisfaction.

In addition, by means of the vehicle display device of the present embodiment, the switching unit 4 increases the transmittance of the display portion for the information displayed on the third layer L3 while moving the display portion. It is thus possible to emphasize the visual effect of the effecting process.

In addition, by means of the vehicle display device according to the present embodiment, the switching unit 4 executes the effecting process with respect to the display portion for the information displayed on the third layer L3 in the state before the switch, and after the display portion for the information displayed on the third layer L3 in the state before the switch can no longer be seen by the user in the display information, executes the effecting process with respect to the display portion for the information to be displayed on the third layer L3 in the state after the switch. It is thus possible to emphasize the visual effect of the effecting process while suppressing the occurrence of screen flicker.

In addition, by means of the vehicle display device of the present embodiment, the switching unit 4 moves the display portion for the information displayed on the third layer L3 so as not to overlap the map information and the image information displayed on the first layer L1. It is thus possible to suppress the occurrence of situations in which the map information and the vehicle periphery information are obscured by the display portion for the information displayed on the third layer L3.

In addition, by means of the vehicle control device according to the present embodiment, the control unit 2 that controls the display of information on the first layer L1, the display of the dummy background on the second layer L2, the display of information on the third layer L3, and the display of the display information that is generated by the superposing unit 3 is provided, and the control unit 2 outputs to the display unit 11 the display information generated by the superposing unit 3. It is thus possible to display the information obtained by superposing the first layer L1 through the third layer L3 on the display unit 11.

In addition, by means of the vehicle control device according to the present embodiment, after it is confirmed that it is possible to control the display portion for the information displayed on the first layer L1, that it is possible to change the transmittance of the dummy background of the second layer L2, and that it is possible to execute an effecting process with respect to the display portion for the information displayed on the third layer L3, in the control unit 2, the switching unit 4 switches between the first state and the second state. As a result, it is possible to suppress the occurrence of situations in which screen flicker occurs due to inappropriate control of the display of some layers.

In addition, by means of the vehicle display device according to the present embodiment, a fourth layer L4 that displays information other than the map information and the image information is provided, the superposing unit 3 superposes the fourth layer L4 on the third layer L3 when generating the display information, and the switching unit 4 does not execute the effecting process with respect to the display portion for the information displayed on the fourth layer L4 when switching between the first state and the second state. It is thus possible to display separately on another layer information which has not been subjected to the effecting process by the switching unit 4, and, as a result, it is possible to reduce the computational load accompanying the execution of the effecting process.

In addition, by means of the vehicle display device according to the present embodiment, a fifth layer L5 that displays a background, parts of which being of higher brightness than the other parts, is provided, and, when the display information is generated, the superposing unit 3 superposes the fifth layer L5 on the second layer L2 and superposes the third layer L3 on the fifth layer L5. It is thus possible to display on the display unit 11 the information obtained by superposing the first layer L1 through the fifth layer L5.

In addition, by means of the vehicle control device according to the present embodiment, the control unit 2 that controls the display of information on the first layer L1, the display of the dummy background on the second layer L2, the display of information on the third layer L3, the display of information on the fourth layer L4, the display of the background on the fifth layer L5, and the display of the display information generated by the superposing unit 3 is provided, and, after it is confirmed, via the control unit 2, that it is possible to control the display portion for the information displayed on the first layer L1, that it is possible to change the transmittance of the dummy background of the second layer L2, that it is possible to execute the effecting process with respect to the display portion for the information displayed on the third layer L3, and that it is possible to change the background of the fifth layer L5, the switching unit 4 switches between the first state and the second state. As a result, it is possible to suppress the occurrence of situations in which screen flicker occurs due to inappropriate control of the display of some layers.

In addition, the vehicle display method according to the present embodiment provides a vehicle display method for carrying out a display using a display device comprising the first layer L1 that displays map information and/or vehicle periphery information, the second layer L2 that displays a dummy background, and the third layer L3 that displays information other than the map information and the image information, wherein the processor 15 of the display device superposes the second layer L2 on the first layer L1, and the third layer L3 on the second layer L2, thereby carrying out the display, when switching, in accordance with a user operation, between a first state, in which the dummy background of the second layer L2 is transparent and the user can see the information displayed on the first layer L1, and a second state, in which the dummy background of the second layer L2 is opaque and the user cannot see the information displayed on the first layer L1, when switching between the first state and the second state, does not execute at least one effecting process from among the switch between the first state and the second state, ending the state before the switch, and starting the state after the switch, with respect to the display portion for the information displayed on the first layer L1, while the first state and the second state are being switched, and changes transmittance of the dummy background to that of the state after the switch, and executes an effecting process that adds the visual effect showing at least one from switch between the first state and the second state, the ending of the state before the switch, and the starting of the state after the switch, with respect to a display portion for the information displayed on the third layer L3 in the first state and/or the display portion for the information to be displayed on the third layer L3 in the second state, while the first state and the second state are being switched. It is thereby possible to suppress an increase in the processing load required for display. In addition, because an increase in the computational load for displaying the map information and the vehicle periphery information is suppressed, it is possible to execute a visual effect that increases user satisfaction, while suppressing the occurrence of screen flicker.

The invention claimed is:

1. A vehicle display device comprising:
    a first layer that displays at least one of map information and vehicle periphery information;
    a second layer that displays a dummy background;
    a third layer that displays information other than the map information and the vehicle periphery information;
    a superposing unit that superposes the second layer on the first layer, and the third layer on the second layer, thereby generating display information; and
    a switching unit that switches in accordance with a user operation between a first state, in which the dummy background is transparent and the user can see the information displayed on the first layer in the display information, and a second state, in which the dummy background is opaque and the user cannot see the information displayed on the first layer in the display information, wherein
    when receiving a user operation input, the switching unit is configured to cause the switch from the first state to the second state with the dummy background being opaque and the information displayed on the third layer being displayed over the dummy background, and then switch back to the first state with the dummy background being transparent and the information displayed on the third layer being displayed over the at least one of map information and vehicle periphery information of the first layer, and
    when switching between the first state and the second state, the switching unit is further configured to
    not execute an effecting processing that adds a visual effect showing at least one of a switch between the first state and the second state, an ending of a state before the switch and a starting of a state after the switch, with respect to a displayed portion of the information displayed on the first layer, while switching between the first state and the second state, and change a transmittance of the dummy background to that of the state after the switch, and execute the effecting processing that adds the visual effect showing at least one of the switch between the first state and the second state, the ending of the state before the switch and the starting of the state after the switch, with respect to at least one of a displayed portion of the information displayed on the third layer in the first state and a displayed portion of the information displayed on the third layer in the second state, while switching between the first state and the second state such that the transmittance of the dummy background is changed only during switching between the first and second states.

2. The vehicle display device according to claim 1, wherein
when switching between the first state and the second state, the switching unit configured to erase the information displayed on the display portion in a state before the switch with a passage of time, and causes the information to be displayed in the display portion in a state after the switch to appear with a passage of time.

3. The vehicle display device according to claim 1, wherein
the switching unit is configured to execute the effecting process including at least one of moving, shrinking, enlarging and changing the transmittance of the display portion for the information displayed on the third layer.

4. The vehicle display device according to claim 1, wherein
the switching unit is configured to increase the transmittance of the display portion for the information displayed on the third layer while moving the display portion.

5. The vehicle display device according to claim 1, wherein
the switching unit is configured to execute the effecting process with respect to the display portion for the information displayed on the third layer in the state before the switch, and is configured to execute the effecting process with respect to the display portion for the information to be displayed on the third layer in the state after the switch after the display portion for the information displayed on the third layer in the state before the switch can no longer be seen by the user in the display information.

6. The vehicle display device according to claim 1, wherein
the switching unit is configured to move the display portion for the information displayed on the third layer so as not to overlap the map information and the vehicle periphery information displayed on the first layer.

7. The vehicle control device according to claim 1, further comprising
a control unit configured to control the information to be displayed on the first layer, the dummy background to be displayed on the second layer, the information displayed to be on the third layer, and the display information to be displayed that is generated by the superposing unit, and
the control unit being configured to output the display information generated by the superposing unit to a display unit.

8. The vehicle control device according to claim 7, wherein after the control unit confirms that control of the display portion for the information displayed on the first layer is possible, that change of the transmittance of the dummy background of the second layer is possible, and that execution of the effecting process with respect to the display portion for the information displayed on the third layer is possible, the switching unit configured to switch between the first state and the second state.

9. The vehicle display device according to claim 1, further comprising
a fourth layer that displays information other than the map information and the vehicle periphery information,
the superposing unit superposes the fourth layer on the third layer when generating the display information, and
the switching unit does not execute the effecting process on the information displayed on the fourth layer when switching between the first state and the second state.

10. The vehicle display device according to claim 9, further comprising
a fifth layer that displays a brighter background than other parts, and
the superposing unit superposes the fifth layer on the second layer and superposes the third layer on the fifth layer when generating the display information.

11. The vehicle control device according to claim 10, further comprising
a control unit configured to control the information to be displayed on the first layer, the dummy background to be displayed on the second layer, the information to be displayed on the third layer, the information to be displayed on the fourth layer, the background to be displayed on the fifth layer, and the display information to be displayed and generated by the superposing unit, and
after the control unit confirms that control of the display portion for the information displayed on the first layer is possible, that change of the transmittance of the dummy background of the second layer is possible, that execution of the effecting process with respect to the display portion for the information displayed on the third layer is possible, and that change of the background of the fifth layer is possible, the switching unit configured to switch between the first state and the second state.

12. The vehicle display device according to claim 1, wherein
the dummy background is sized and shaped to cover all of the map information and the vehicle periphery information displayed by the first layer.

13. A vehicle display method for executing a display using a display device comprising a first layer that displays at least one of map information and vehicle periphery information, a second layer that displays a dummy background, and a third layer that displays information other than the map information and the vehicle periphery information, the vehicle display method comprising:
a processor of the display device carrying out a display by superposing the second layer on the first layer, and superposing the third layer on the second layer;
switching in accordance with a user operation between a first state in which the dummy background of the second layer is transparent and the user can see the information displayed on the first layer, and a second state in which the dummy background of the second layer is opaque and the user cannot see the information displayed on the first layer;

when receiving a user operation input, causing the switching from the first state to the second state with the dummy background being opaque and the information displayed on the third layer being displayed over the dummy background, and then switching back to the first state with the dummy background being transparent and the information displayed on the third layer being displayed over the at least one of map information and vehicle periphery information of the first layer, and when switching between the first state and the second state, not executing at least one effecting process, from among the switch between the first state and the second state, ending the state before the switch, and starting the state after the switch, with respect to the display portion for the information displayed on the first layer, while switching between the first state and the second state; and changing a transmittance of the dummy background to that of the state after the switch, and executing the effecting processing that adds the visual effect showing at least one of the switch between the first state and the second state, the ending of the state before the switch and the starting of the state after the switch, with respect to at least one of a displayed portion of the information displayed on the third layer in the first state and a displayed portion of the information displayed on the third layer in the second state, while switching between the first state and the second state such that the transmittance of the dummy background is changed only during switching between the first and second states.

14. The vehicle display method according to claim 13, wherein the dummy background is sized and shaped to cover all of the map information and the vehicle periphery information displayed by the first layer.

* * * * *